United States Patent
Chung et al.

(10) Patent No.: US 8,848,141 B2
(45) Date of Patent: Sep. 30, 2014

(54) DISPLAY PANEL AND DISPLAY APPARATUS HAVING THE SAME

(75) Inventors: Seong-eun Chung, Seoul (KR); Dong-hwan Kim, Seoul (KR); Il-yong Jung, Yongin-si (KR); Tae-bae Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 13/208,886

(22) Filed: Aug. 12, 2011

(65) Prior Publication Data

US 2012/0206676 A1 Aug. 16, 2012

Related U.S. Application Data

(60) Provisional application No. 61/442,394, filed on Feb. 14, 2011.

(30) Foreign Application Priority Data

Apr. 22, 2011 (KR) .................. 10-2011-0037633

(51) Int. Cl.
G02F 1/1335 (2006.01)

(52) U.S. Cl.
CPC .............. *G02F 1/133516* (2013.01); *G02F 2001/133548* (2013.01); *G02F 1/133533* (2013.01); *G02F 2201/30* (2013.01); *G02F 2203/10* (2013.01); *G02F 2202/36* (2013.01)
USPC .............................. 349/97; 349/96

(58) Field of Classification Search
None
See application file for complete search history.

(56) References Cited

U.S. PATENT DOCUMENTS

| 6,040,936 | A | 3/2000 | Kim et al. |
| 6,147,724 | A | 11/2000 | Yoshii et al. |
| 7,306,338 | B2 | 12/2007 | Hansen et al. |
| 7,375,887 | B2 | 5/2008 | Hansen et al. |
| 7,414,784 | B2 | 8/2008 | Mi et al. |

(Continued)

FOREIGN PATENT DOCUMENTS

| CN | 1727957 A | 2/2006 |
| CN | 1900750 A | 1/2007 |

(Continued)

OTHER PUBLICATIONS

Communication dated Jul. 31, 2012 issued by the Korean Intellectual Property Office in counterpart Korean Patent Application No. 10-2011-0037630.

(Continued)

*Primary Examiner* — Thanh-Nhan P Nguyen
(74) *Attorney, Agent, or Firm* — Sughrue Mion, PLLC

(57) ABSTRACT

A display panel and a display apparatus having the same are provided. The display panel includes a liquid crystal layer and comprises first and second substrates which are disposed opposite to each other; a color filter polarizing layer which formed on one surface between the first and second substrates, and which includes a first metal linear grid arranged at different pitches to emit a first polarized component of incident light with different colors; and a polarizing layer which includes a second metal linear grid formed on an opposite surface to the surface between the first and second substrates, wherein a metal material contained in the first metal linear grid is different from a metal material contained in the second metal linear grid. The provided display panel and display apparatus including the same, have decreased manufacturing costs and a simplified manufacturing process.

22 Claims, 29 Drawing Sheets

(56) References Cited

U.S. PATENT DOCUMENTS

| | | | |
|---|---|---|---|
| 7,420,156 | B2 | 9/2008 | Kim et al. |
| 7,468,838 | B2 | 12/2008 | Cha et al. |
| 7,697,203 | B2 | 4/2010 | Cha et al. |
| 8,125,592 | B2 | 2/2012 | Takada |
| 8,199,282 | B2 | 6/2012 | Sugita et al. |
| 8,269,904 | B2 | 9/2012 | Lee |
| 2004/0174491 | A1* | 9/2004 | Yu Kao et al. ............... 349/190 |
| 2006/0023143 | A1 | 2/2006 | Lee |
| 2006/0056024 | A1 | 3/2006 | Ahn et al. |
| 2007/0019292 | A1 | 1/2007 | Kim et al. |
| 2008/0094547 | A1 | 4/2008 | Sugita et al. |
| 2008/0100781 | A1 | 5/2008 | Choo et al. |
| 2008/0135739 | A1 | 6/2008 | Kim et al. |
| 2008/0143638 | A1 | 6/2008 | Kim et al. |
| 2008/0192346 | A1 | 8/2008 | Kim et al. |
| 2008/0252799 | A1 | 10/2008 | Lee et al. |
| 2008/0303987 | A1* | 12/2008 | Kumai ........................... 349/96 |
| 2008/0316599 | A1 | 12/2008 | Wang et al. |
| 2009/0273744 | A1 | 11/2009 | Wang et al. |
| 2009/0278954 | A1 | 11/2009 | Kanamori et al. |
| 2009/0310044 | A1* | 12/2009 | Lee ................................ 349/15 |
| 2010/0046060 | A1 | 2/2010 | Lee et al. |
| 2010/0091217 | A1 | 4/2010 | Kim et al. |
| 2011/0273531 | A1 | 11/2011 | Ito et al. |

FOREIGN PATENT DOCUMENTS

| | | |
|---|---|---|
| JP | 2004-533644 A | 11/2004 |
| JP | 2006-39545 A | 2/2006 |
| JP | 2007-025692 A | 2/2007 |
| JP | 2008-102416 A | 5/2008 |
| JP | 2009-42319 A | 2/2009 |
| JP | 2010-049017 A | 3/2010 |
| JP | 4500360 B2 | 7/2010 |
| JP | 2010-197764 A | 9/2010 |
| JP | 2010-286848 A | 12/2010 |
| JP | 2011-124935 A | 6/2011 |
| KR | 10-0483352 B1 | 4/2005 |
| KR | 10-0600037 B1 | 7/2006 |
| KR | 1020060105350 A | 10/2006 |
| KR | 1020060105351 A | 10/2006 |
| KR | 10-0662046 B1 | 12/2006 |
| KR | 10-2007-0010472 A | 1/2007 |
| KR | 10-0716669 B1 | 5/2007 |
| KR | 1020080004880 A | 1/2008 |
| KR | 10-0824782 B1 | 4/2008 |
| KR | 10-0825905 B1 | 4/2008 |
| KR | 1020080075753 A | 8/2008 |
| KR | 1020090025590 A | 3/2009 |
| KR | 10-2010-0009001 A | 1/2010 |
| KR | 1020100084865 A | 7/2010 |
| KR | 101007198 B1 | 1/2011 |

OTHER PUBLICATIONS

Communication dated Aug. 31, 2012 issued by the Korean Intellectual Property Office in counterpart Korean Patent Application No. 10-2011-0037632.
Communication dated Oct. 4, 2012 issued by the International Searching Authority in counterpart International Application No. PCT/KR2012/000161.
Communication dated Oct. 4, 2012 issued by the International Searching Authority in counterpart International Application No. PCT/KR2012/000158.
Communication dated Sep. 26, 2012 issued by the International Searching Authority in counterpart International Application No. PCT/KR2012/000159.
Ye, et al., "Efficiency improvement for a polarizing color filter based on submicron metal grating", 2010, vol. 7848, pp. 1-8, XP040546046.
Xu, et al., "Nanostructured metal-insulator-metal resonators for high-resolution color filtering and spectral imaging", Jan. 24, 2011, vol. 7946, pp. 1-6, XP040555106.
Communication dated Apr. 18, 2012 issued by the European Patent Office in counterpart European Patent Application No. 11179626.4.
Communication dated Apr. 18, 2012 issued by the European Patent Office in counterpart European Patent Application No. 11177489.9.
Communication dated Apr. 18, 2012 issued by the European Patent Office in counterpart European Patent Application No. 11177487.3.
Communication dated Apr. 18, 2012 issued by the European Patent Office in counterpart European Patent Application No. 11179633.0.
Ebbesen, T.W., et al., "Extraordinary optical transmission through sub-wavelength hole arrays", Nature, Feb. 1998, pp. 667-669, vol. 391.
Catrysse, P., et al., "One-mode model for patterned metal layers inside integrated color pixels", Optics Letters, May 2004, pp. 974-976, vol. 29, No. 9.
Xu, T., et al., "Plasmonic nanoresonators for high-resolution colour filtering and spectral imaging", Nature Communications, Aug. 2010, pp. 1-5.
Lee, H.-S., et al., "Color Filter Based on a Sub-wavelength Patterned Metal Grating", Hankook Kwanghak Hoeji, Dec. 2007, pp. 383-388, vol. 18, No. 6.
Communication dated Dec. 28, 2012 from the Korean Intellectual Property Office in counterpart Korean application No. 10-2011-0037631.
Communication dated Nov. 14, 2012 from the Korean Intellectual Property Office in counterpart Korean application No. 10-2011-0037630.
USPTO Office Action dated Jun. 20, 2013 issued in co-pending U.S. Appl. No. 13/209,028.
Communication dated Jun. 3, 2013 from the Korean Intellectual Property Office in a counterpart application No. 10-2011-0037632.
Communication from the Japanese Patent Office dated Jun. 4, 2013, in a counterpart Japanese application No. 2012-025201.
Communication, dated Nov. 29, 2013, issued by the European Patent Office in counterpart European Patent Application No. 11 179 626.4.
Communication, dated Nov. 29, 2013, issued by the European Patent Office in counterpart European Patent Application No. 11 179 633.0.
Translation of Communication, dated Nov. 20, 2013, issued by the Mexican Industrial Property Office in counterpart Mexican Patent Application No. MX/a/2012/001613.
Translation of Communication, dated Nov. 20, 2013, issued by the Mexican Industrial Property Office in counterpart Mexican Patent Application No. MX/a/2012/001614.
Final US Office Action, dated Dec. 17, 2013, issued by the USPTO in related U.S. Appl. No. 13/209,028.
Non-Final US Office Action, dated Nov. 8, 2013, issued by the USPTO in related U.S. Appl. No. 13/208,906.
Communication dated Feb. 25, 2014 issued by the Japanese Patent Office in counterpart Japanese Application No. 2012-025201.
Communication dated Apr. 1, 2014 issued by the State Intellectual Property Office of P.R. China in counterpart Chinese Application No. 201210020043.7.
Communication dated Apr. 17, 2014 issued by the Australian Intellectual Property Office in counterpart Australian Application No. 2012200116.
Non-Final Office Action dated Apr. 4, 2014 issued by the U.S. Patent and Trademark Office in U.S. Appl. No. 13/209,028.
Communication dated May 12, 2014, issued by the Mexican Institute of Industrial Property in counterpart Mexican Application No. MX/a/2012/001614.
Communication dated Jun. 9, 2014, issued by the United States Patent and Trademark Office in counterpart U.S. Appl. No. 13/208,906.
Communication dated Jul. 29, 2014 issued by the European Patent Office in counterpart European Application No. 11 179 633.0.
Communication dated Jul. 29, 2014 issued by the European Patent Office in counterpart European Application No. 11 179 626.4.

* cited by examiner

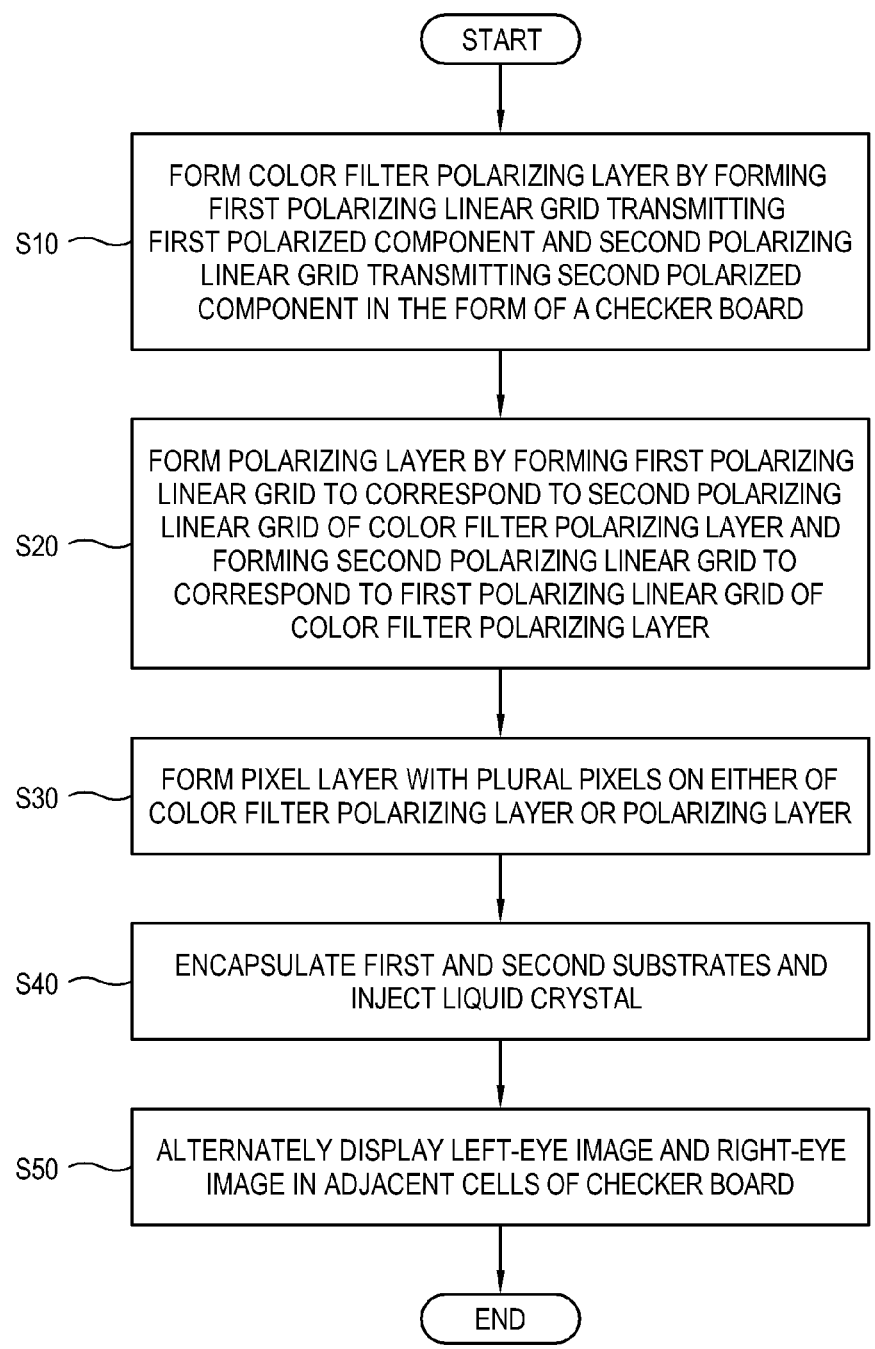

DISPLAY PANEL AND DISPLAY APPARATUS HAVING THE SAME

CROSS-REFERENCE TO RELATED APPLICATIONS

This application claims the benefit of U.S. Provisional Patent Application No. 61/442,394, filed on Feb. 14, 2011 in the United States Patent and Trademark Office and Korean Patent Application No. 10-2011-0037633, filed on Apr. 22, 2011 in the Korean Intellectual Property Office, the disclosures of which are incorporated herein by reference.

BACKGROUND

1. Field

Apparatuses and methods consistent with the exemplary embodiments relate to a display panel and a display apparatus including the same, and more particularly, to a display panel including a color filter polarizing layer and a polarizing layer and a display apparatus including the same.

2. Description of the Related Art

A liquid crystal display (LCD) panel includes first and second substrates having a liquid crystal layer therebetween, and a polarizing film for polarizing light incident to the first and second substrates. Also, the LCD panel includes a color filter layer to create different colors with the incident light. While the incident light passes through the polarizing film and the color filter layer, its optical efficiency becomes lowered. Meanwhile, the LCD panel may further include a dual brightness enhance film (DBEF) at a light-incident side so as to compensate for light loss due to polarization.

The polarizing film and the DBEF increase manufacturing costs of the LCD panel or the display apparatus and make a manufacturing process complicated.

SUMMARY

Accordingly, one or more exemplary embodiments provide a display panel and a display apparatus including the same, in which manufacturing costs are decreased and a manufacturing process is simplified.

According to an aspect of an exemplary embodiment, there is provided a display panel having improved optical efficiency and a display apparatus including the same.

According to still another aspect of an exemplary embodiment, there is provided a display apparatus which has a passive type stereoscopic image excellent in visibility.

The foregoing and/or other aspects may be achieved by providing a display panel with a liquid crystal layer, including first and second substrates which are disposed opposite to each other; a color filter polarizing layer which is formed on one surface between the first and second substrates, and includes a first metal linear grid arranged at different pitches to emit a first polarized component of incident light with different colors; and a polarizing layer which includes a second metal linear grid formed on a surface opposite to the one surface between the first and second substrates, wherein a metal contained in the first metal linear grid has different properties from a metal contained in the second metal linear grid.

One of the first metal linear grid and the second metal linear grid arranged on a substrate for incident light may have higher reflectivity than the other one.

One of the first metal linear grid and the second metal linear grid arranged on a substrate for exiting light may be stronger than the other one.

The metal contained in the first metal linear grid may be different in material from the metal contained in the second metal linear grid.

One of the first substrate and the second substrate for incident light may further include a light absorbing layer formed on the metal linear grid and absorbing light.

One of the first substrate and the second substrate for exiting light may further include a light absorbing layer formed beneath the metal linear grid and absorbing light.

According to another aspect of the exemplary embodiments, the display panel may further include a pixel layer formed on one surface between the first substrate and the second substrate and formed with a pixel including a plurality of sub pixels, wherein at least three sub pixels are different in the pitch of the first metal linear grid.

The first metal linear grid may include a red metal linear grid, a green metal linear grid and a blue metal linear grid, and the red metal linear grid has every pitch shorter than ½ of a red light wavelength, the green metal linear grid has every pitch shorter than ½ of a green light wavelength, and the blue metal linear grid has every pitch shorter than ½ of a blue light wavelength.

The first metal linear grid may include a first metal layer, an insulating layer, and a second metal layer stacked in sequence.

The height of the first metal linear grid may be larger than the width thereof.

The color filter polarizing layer may further include a dielectric layer stacked beneath the first metal linear grid.

According to another aspect of the exemplary embodiment, there is provided a display apparatus with a liquid crystal layer, including a display panel which includes first and second substrates which are disposed opposite to each other, a color filter polarizing layer which is formed on one surface between the first and second substrates, and includes a first metal linear grid arranged at different pitches to emit a first polarized component of incident light with different colors, and a polarizing layer which includes a second metal linear grid formed on an opposite surface to the one surface between the first and second substrates, wherein a metal contained in the first metal linear grid has different properties from a metal contained in the second metal linear grid; and a backlight assembly which emits light to the display panel.

BRIEF DESCRIPTION OF THE DRAWINGS

The above and/or other aspects will become apparent and more readily appreciated from the following description of the exemplary embodiments, taken in conjunction with the accompanying drawings, in which:

FIG. 27 is a view for explaining a manufacturing method of the display apparatus of FIG. 26.

DETAILED DESCRIPTION OF THE EXEMPLARY EMBODIMENTS

Figure 1:
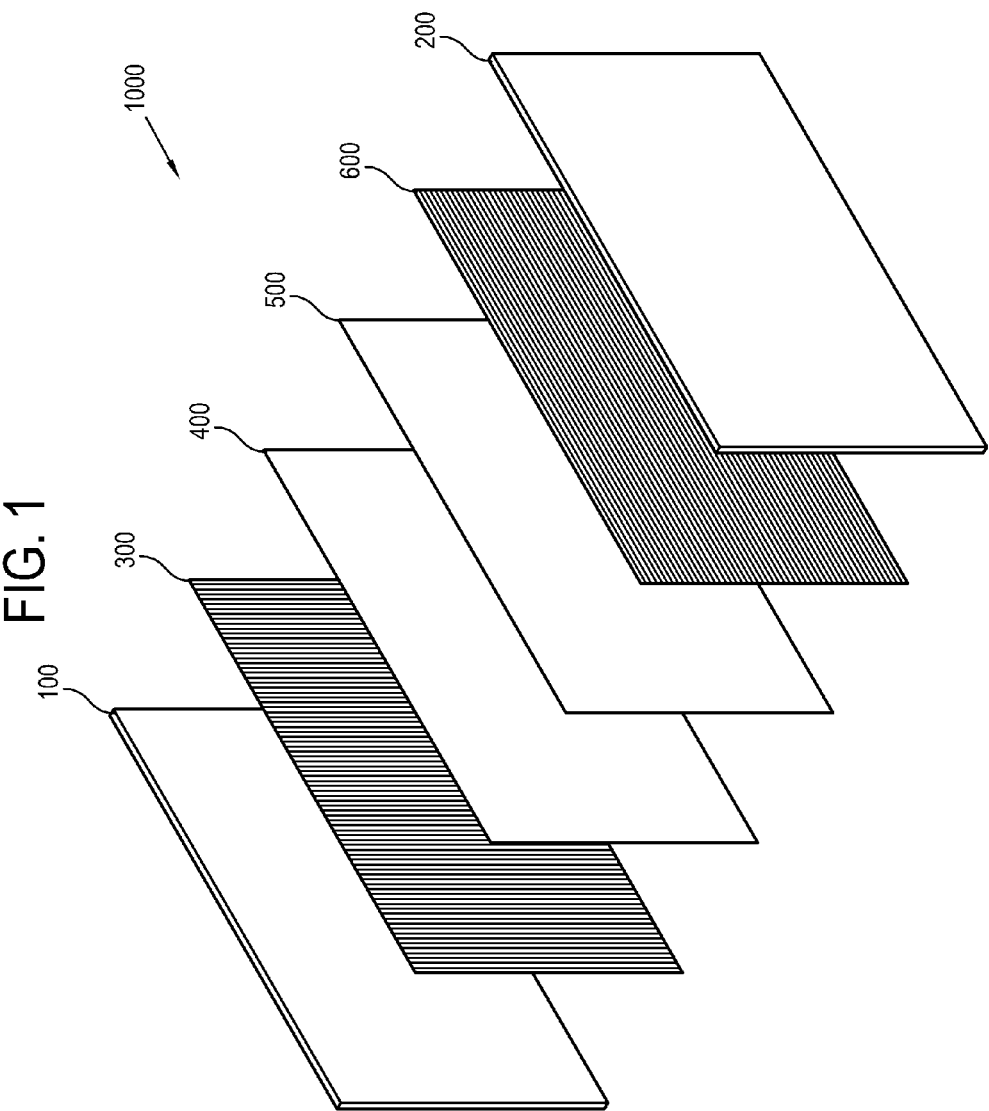
FIG. 1 shows a layer structure of a display panel according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Figure 2:
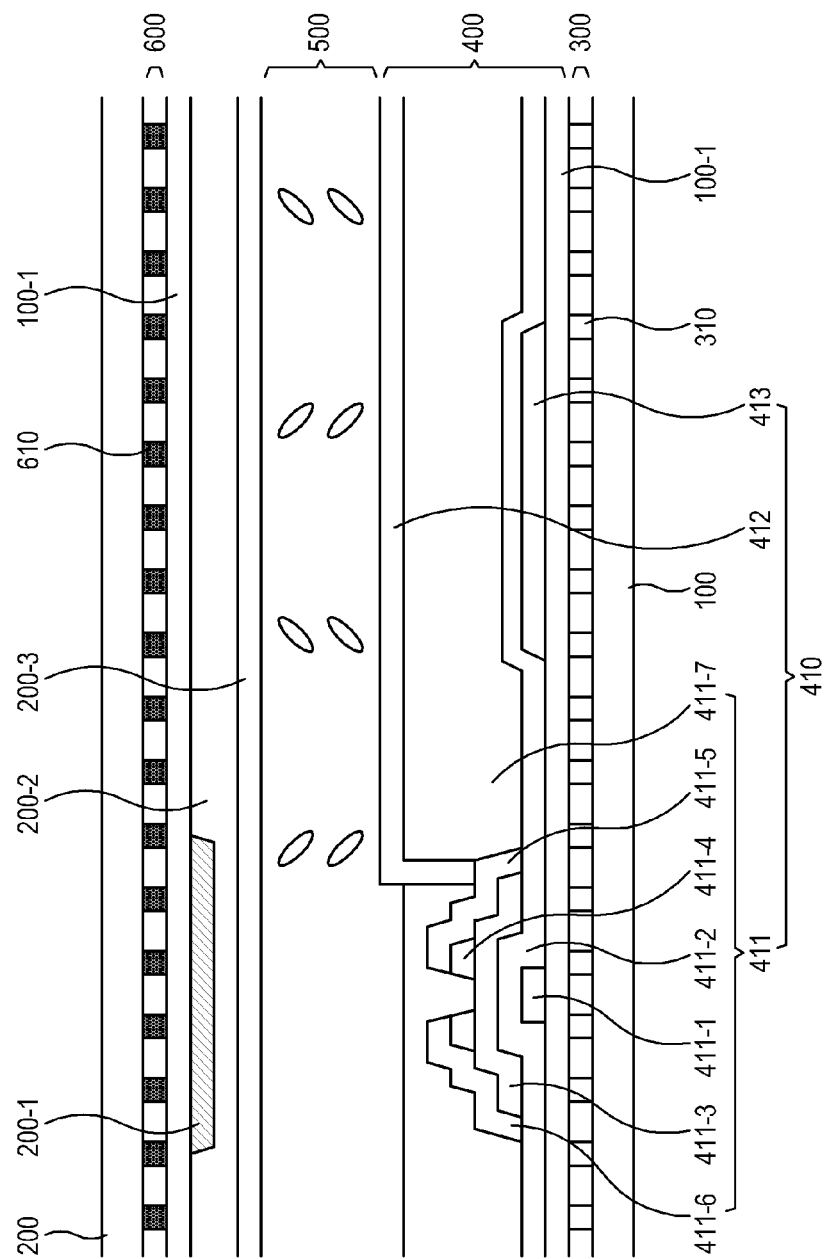
FIG. 2 is a cross-section view of a display panel of FIG. 1.

FIG. 1 shows a layer structure of a display panel according to an exemplary embodiment, and FIG. 2 is a cross-section view of a display panel of FIG. 1.

As shown therein, a display panel 1000 in this exemplary embodiment includes first and second substrates 100 and 200 opposite to each other, and a color filter polarizing layer 300, a pixel layer 400 and a liquid crystal layer 500 and a polarizing layer 600 arranged in sequence between the first and second substrates 100 and 200. The display panel 1000 including the liquid crystal layer 500 may be used in a television, home appliances such as a monitor, a cellular phone, a portable multimedia player (PMP), a Netbook, a notebook computer, a mobile terminal such as an E-book terminal or the like, a display apparatus for exhibition and advertisement, etc.

The color filter polarizing layer 300 and the pixel layer 400 are formed in sequence on the first substrate 100, and a polarizing layer 600 is formed on the second substrate 200. As shown in FIG. 2, the second substrate 200 is formed with a black matrix 200-1 in a region corresponding to the TFT 411 of the first substrate 100, and a common electrode 200-3 generating a voltage corresponding to the pixel electrode 412. The liquid crystal layer 500, of which alignment is adjusted by applied voltage, is inserted between the first and second substrates 100 and 200. The array of the liquid crystal layer 500 is controlled in accordance with a twisted nematic (TN) mode, a vertical alignment (VA) mode, a patterned vertical alignment (PVA) mode, an in-plane switching (IPS) mode or the like operating mode of the display panel 1000. To improve an optical viewing angle, sub pixels are divided or patterned, the refractive index of the liquid crystal is uniformly adjusted, or the like technology may be used.

The color filter polarizing layer 300 is formed on the first substrate 100, and the pixel layer 400 for controlling the liquid crystal array and displaying an image is formed on the color filter polarizing layer 300. The color filter polarizing layer 300 includes the first metal linear grid 310 arranged with different pitches so that first polarized component of the incident light can be emitted as light of different color. The polarizing layer 600 may include a second metal linear grid 610 that transmits light of a second polarized component different from the first polarized component, and changes only a polarized state of the incident light. On the first metal linear grid 310 and the second metal linear grid 610, a planarization layer 100-1 is formed for protecting and leveling them. The first metal linear grid 310 included in the color filter polarizing layer 300 and the second metal linear grid 610 included in the polarizing layer 600 will be described below in detail.

The pixel layer 400 formed on the planarization layer 100-1 includes a plurality of pixels (not shown) for changing the liquid crystal array filled in the liquid crystal layer 500 based on a control signal received from the exterior, and each pixel includes a plurality of sub pixels 410. In this exemplary embodiment, the sub pixels 410 represent the smallest unit pixel in which video signal values corresponding to red, green and blue are input, and a unit, which includes a plurality of sub pixels 410 and expresses one video signal, is regarded as the pixel. The sub pixel 410 includes a thin film transistor (TFT) 411 as a switching device, and a pixel electrode 412. The sub pixel 410 has a two-dimensional spatial concept as well as a physical concept including the TFT 411 and the pixel electrode 412.

On the planarization layer 100-1 of the first substrate 100, the gate electrode 411-1 is formed. The gate electrode 411-1 may be a single or multiple layers containing metal. On the same layer as the gate electrode 411-1, there are further formed a gate line (not shown) connected to the gate electrode and arranged in a transverse direction of the display panel 1000, and a gate pad (not shown) connected to a gate driver (not shown) and transmitting a driving signal to the gate line. Also, on the same layer as the gate electrode 411-1, a sustain electrode 413 is formed for building up electric charges.

On the first substrate 100, a gate insulating layer 411-2 containing silicon nitride ($SiN_x$) or the like covers the gate electrode 411-1 and the sustain electrode 413.

On the gate insulating layer 411-2 of the gate electrode 411-1, a semiconductor layer 411-3 containing amorphous silicon or the like semiconductor is formed. On the semiconductor layer 411-3, an ohmic contact layer 411-4 containing n+ hydrogenated amorphous silicon or the like material highly doped with silicide or n-type impurities is formed. Further, the ohmic contact layer 411-4 is removed in a channel portion between a source electrode 411-5 and a drain electrode 411-6 to be described later.

On the ohmic contact layer 411-4 and the gate insulating layer 411-2, data wiring lines 411-5 and 411-6 are formed. The data wiring lines 411-5 and 411-6 may also be a single or multiple layers containing metal. The data wiring lines 411-5 and 411-6 includes a data line (not shown) formed in a vertical direction and intersecting a gate line (not shown) to form the sub pixel 410, a source electrode 411-5 branched from the data line and extended to an upper portion of the ohmic contact layer 411-4, and a drain electrode 411-6 separated from the source electrode 411-5 and formed on an upper portion of the ohmic contact layer 411-4 opposite to the source electrode 411-5.

On the data wiring lines 411-5 and 411-6 and the semiconductor layer 411-3 that is not covered with the data wiring lines 411-5 and 411-6, a passivation layer 411-7 is formed. At this time, silicon nitride or the like inorganic insulting film may be further formed between the passivation layer 411-7 and the TFT 411, thereby securing the reliability of the TFT 411.

Typically, the pixel electrode 412 formed on the passivation layer 411-7 contains indium tin oxide (ITO) or indium zinc oxide (IZO), or the like transparent conductive material. The pixel electrode 412 is electrically connected to the source electrode 411-5.

On the planarization layer 100-1 of the second substrate 200, the black matrix 200-1 is formed in a region corresponding to the TFT 411 of the first substrate 100. Generally, the black matrix 200-1 serves to divide the sub pixels 410 and prevent the TFT 411 from being exposed to external light. The black matrix 200-1 contains a photosensitive organic material with black dye. As the black dye, carbon black, titanium oxide or the like is used.

On the black matrix 200-1, an overcoat layer 200-2 is formed for leveling and protecting the black matrix 200-1. As the overcoat layer 200-2, an acrylic epoxy material is typically used.

On the overcoat layer 200-2, a common electrode 200-3 is formed. The common electrode 200-3 is made of a transparent conductive material such as indium tin oxide (ITO), indium zinc oxide (IZO), etc. The common electrode 200-3, together with the pixel electrode 412 of the first substrate 100, directly applies voltage to the liquid crystal layer 500.

Figure 3:
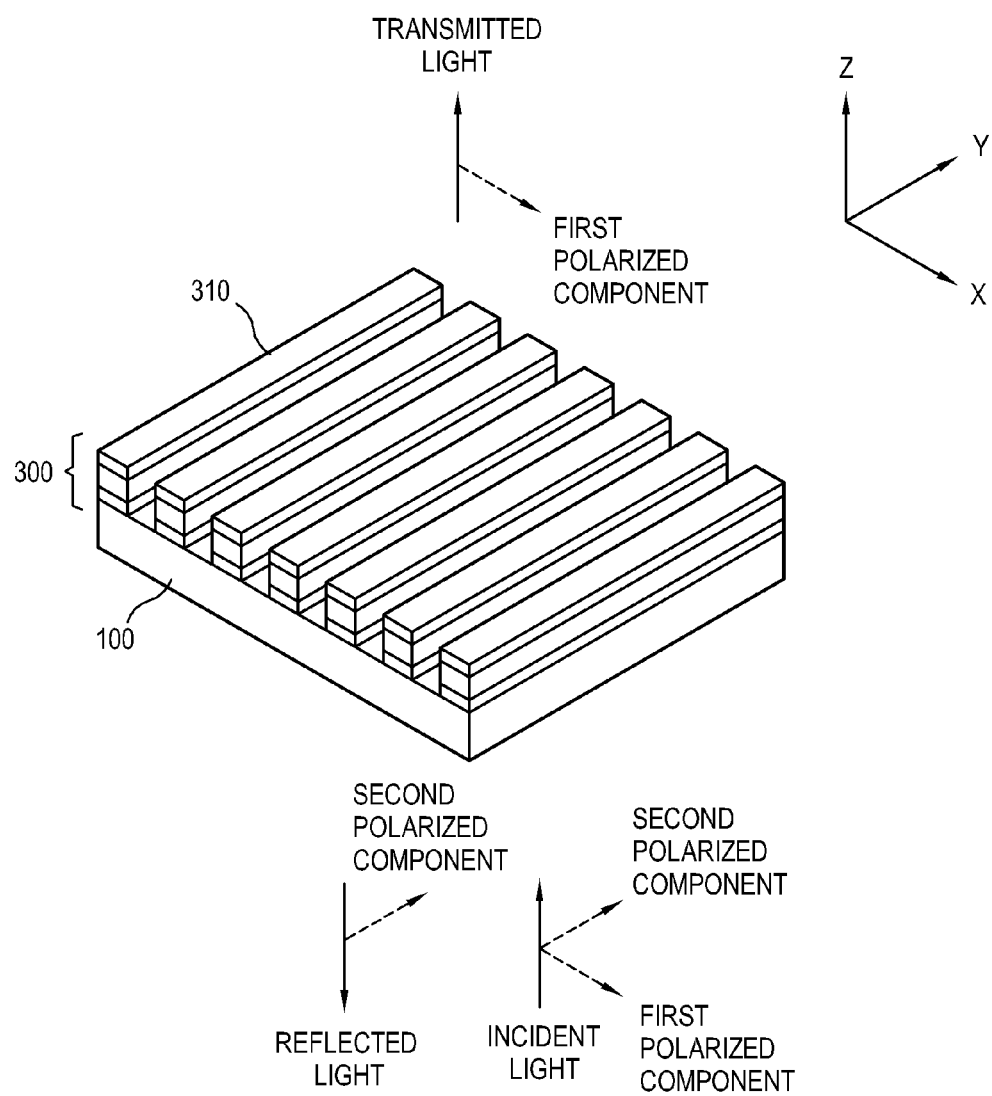
FIG. 3 is a view showing a color filter polarizing layer on a first substrate of FIG. 1.
Figure 4A:
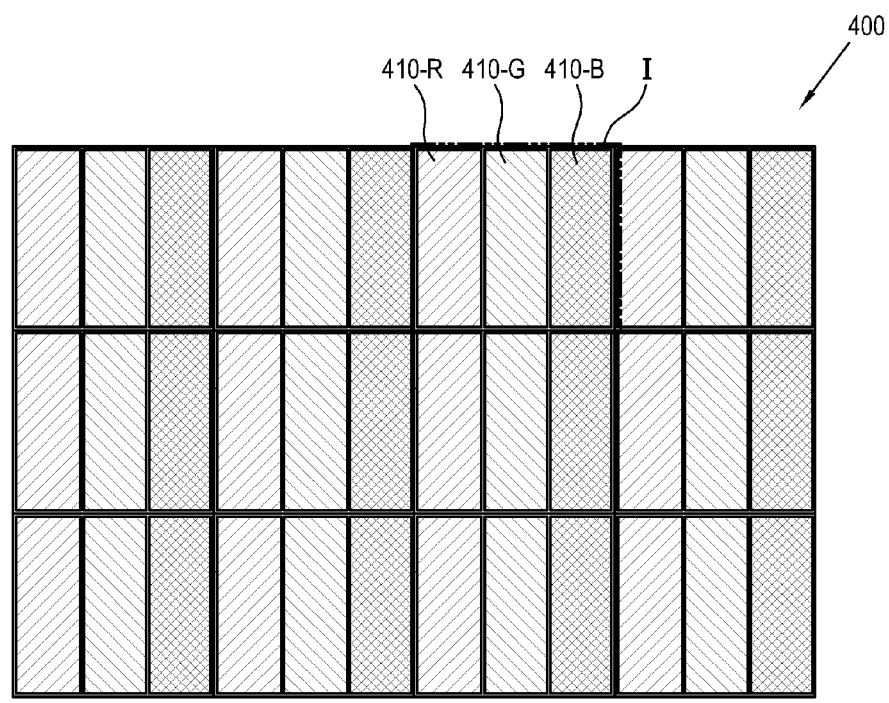
FIGS. 4A and 4B are views for explaining a first metal linear grid of a sub pixel.
Figure 4B:
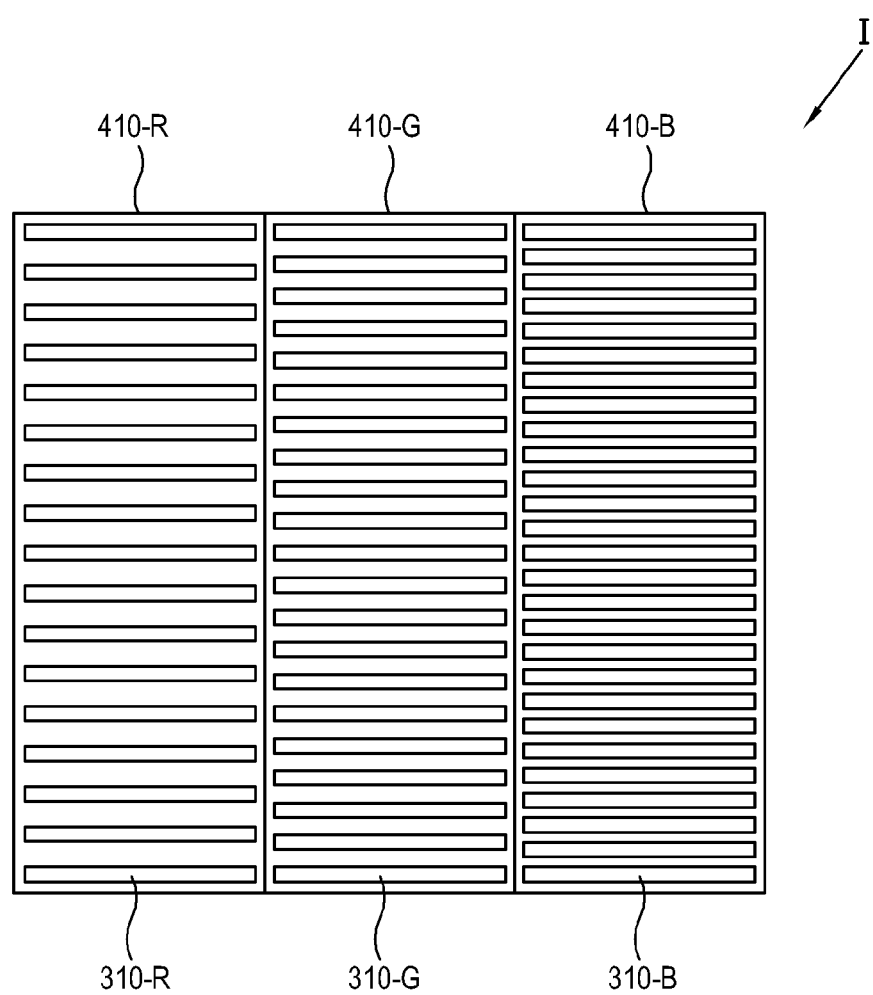
Figure 5:
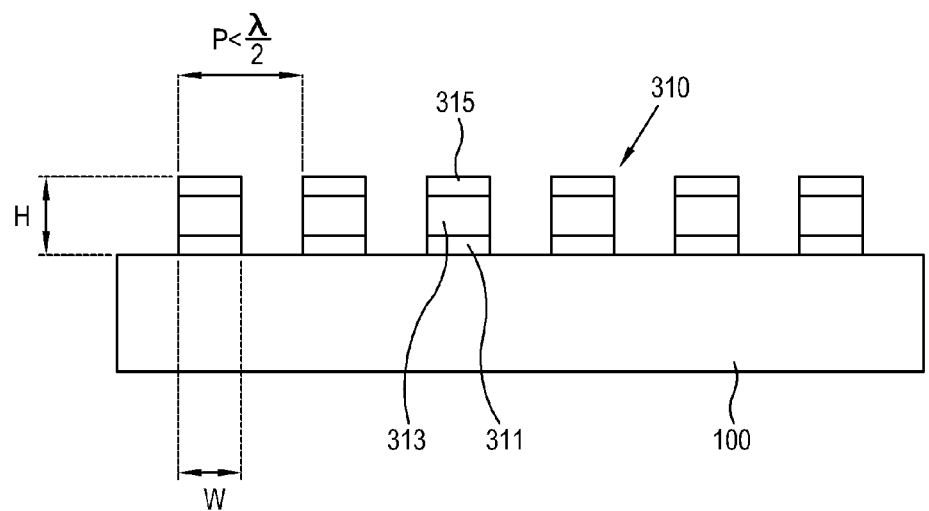
FIG. 5 is a cross-section view of the color filter polarizing layer of FIG. 3.

FIG. 3 is a view showing a color filter polarizing layer on a first substrate of FIG. 1, FIGS. 4A and 4B are views for explaining a first metal linear grid of a sub pixel, and FIG. 5 is a cross-section view of the color filter polarizing layer of FIG. 3.

As shown therein, the first metal linear grid 310 is shaped like a bar arranged in certain direction on the first substrate 100. The first metal linear grid 310 is periodically arranged with certain height (H) and width (W). The cycle, i.e., the pitch of the first metal linear grid 310 is arranged or formed differently according to desired colors of light.

If a pitch of a diffraction grid is adjusted to be equal to or shorter than ½ of the wavelength of the light, a diffraction wave is not formed but only transmitted light and reflected light exist. As shown therein, when the incident light passes through the first metal linear grid 310 shaped like a slit, the first polarized component of the incident light, which is perpendicular to the first metal linear grid 310, is transmitted to the first substrate 100, but a second polarized component, which is perpendicular to the first metal linear grid 310, becomes reflected light to be reflected once again. That is, the incident light passing through the color filter polarizing layer 300 is polarized with respect to a certain direction. Meanwhile, air may be formed in between the first metal linear grids 310.

FIG. 4A is a view showing a pixel I and sub pixels 410-R, 410-G and 410-B constituting the pixel I. In this exemplary embodiment, the pixel I includes a red sub pixel 410-R formed in a region where red light is emitted, a green sub pixel 410-G formed in a region where green light is emitted, and a blue sub pixel 410-B formed in a region where blue light is emitted. The color filter polarizing layer 300 corresponding to such a pixel layer 400 is formed with the first metal linear grid 310 having different pitches according to the sub pixels 410-R, 410-G and 410-B.

FIG. 4B is a view showing the first metal linear grid 310 corresponding to the sub pixels 410-R, 410-G and 410-B. The first metal linear grid 310 includes a red metal linear grid 310-R formed in a region corresponding to the red sub pixel 410-R, a green metal linear grid 310-G formed in a region corresponding to the green sub pixel 410-G, and a blue metal linear grid 310-B formed in a region corresponding to the blue sub pixel 410-B.

The red metal linear grid 310-R is arranged such that every pitch is shorter than ½ of a red light wavelength, the green metal linear grid 310-G is arranged such that every pitch is shorter than ½ of a green light wavelength, and the blue metal linear grid 310-B is arranged such that every pitch is shorter than ½ of a blue light wavelength. Thus, each pitch of the metal linear grids 310-R, 310-G and 310-B is adjusted in accordance with the sub pixels 410-R, 410-G and 410-B, so that the wavelength of the incident light can be controlled to thereby allow the sub pixels 410 to emit light of different colors, respectively.

The pitch of the red metal linear grid 310-R is shorter than ½ of the red light wavelength, i.e., about 330~390 nm, and the incident light is separated into a red light spectrum having a first polarized component while passing through the red metal linear grid 310-R. The pitch of the green metal linear grid 310-G is shorter than ½ of the green light wavelength, i.e., about 250~290 nm, and the incident light is separated into a green light spectrum having the first polarized component. The pitch of the blue metal linear grid 310-B may be set up to be shorter than ½ of the blue light wavelength, i.e., about 220~240 nm. The light passing through the blue metal linear grid 310-B is separated into a blue light spectrum having the first polarized component. In other words, the pitches of the metal linear grid 310 are decreased in order of the red metal linear grid 310-R, the green metal linear grid 310-G and the blue metal linear grid 310-B. The pitch of the first metal linear grid 310 may be adjusted in accordance with light wavelengths of color desired to be emitted from the display panel 1000, and light of yellow, cyan and magenta may be emitted instead of the foregoing light of red, green and blue.

As shown in FIG. 5, the first metal linear grid 310 includes a first metal layer 311, an insulating layer 313 and a second metal layer 315 sequentially stacked. The first metal layer 311 and the second metal layer 315 may be made of metal such as Al, Ag, etc. and may have a height of less than about 100 nm. In this exemplary embodiment, each of the first metal layer 311 and the second metal layer 315 may be formed to have a height of about 40 nm. The insulating layer 313 stacked between the first metal layer 311 and the second metal layer 315 may include a dielectric material such as ZnSe and $TiO_2$, and may be formed to have a height of less than about 150 nm. The height of the first metal linear grid 310 is larger than the width thereof, and a ratio of height to width may be 2~4, for example, 3. In the first metal linear grid 310, the width, the height, the pitch, the ratio of height to width, and a ratio of pitch to width may be varied depending on the material forming the first metal linear grid 310. That is, simulation about optical transmittance is conducted by taking the kind of metal, the height of dielectric material, etc. into account, and an optimal condition may be selected. Also, the width, the height, the pitch, the ratio of height to width, and a ratio of pitch to width of the first metal linear grid 310 may be varied depending on color of emitted light, i.e., each sub pixel 410.

The principle that colored light is emitted from the metal layer 311, 315 of the first metal linear grid 310 is based on Plasmon in which free electrons in metal are collectively oscillated. Nano-sized metal shows Plasmon resonance on a surface of the metal due to the oscillation of the free electrons. The surface Plasmon resonance is collective charge density oscillation of the electrons on the surface of a metal thin film, and a surface Plasmon wave caused by the surface Plasmon resonance is a surface electromagnetic wave propagating along a boundary surface between the metal and the dielectric material adjacent to the metal. As a kind of surface electromagnetic wave propagating along the boundary surface between metal and the dielectric material, the surface Plasmon wave corresponds to a wave generated when light incident to the metal surface and having a certain wavelength is not totally reflected and causes a surface wave. If the metal linear grid 310 including the first metal layer 311, the insulating layer 313 and the second metal layer 315 is arranged in the form of slits in a certain cycle, the color of emitted light is varied depending on the cycle.

According to this exemplary embodiment, the first metal linear grid 310 is configured to make white light filter into individual colors throughout a visible light region. This is to achieve a nano oscillator for quantum-Plasmon-quantum conversion within a certain oscillation wavelength, when enhances a pass bandwidth and makes compactness possible as compared with other color filtering methods. Also, the filtered light has already been naturally polarized, so that it can be directly applied to an LCD panel or the like without any separate polarizing layer.

Accordingly, the display panel 100 can generate polarized colored light through one color filter polarizing layer 300 instead of the existing polarizing film and color filter. Also, light that is not transmitted through the first substrate 100 is not absorbed but is instead reflected from the first metal layer 311 of the first metal linear grid 310, so that it is likely to be reflected again toward the display panel 1000. That is, the total optical efficiency is improved so that the conventional dual brightness enhance film (DBEF) can be omitted.

Figure 6:
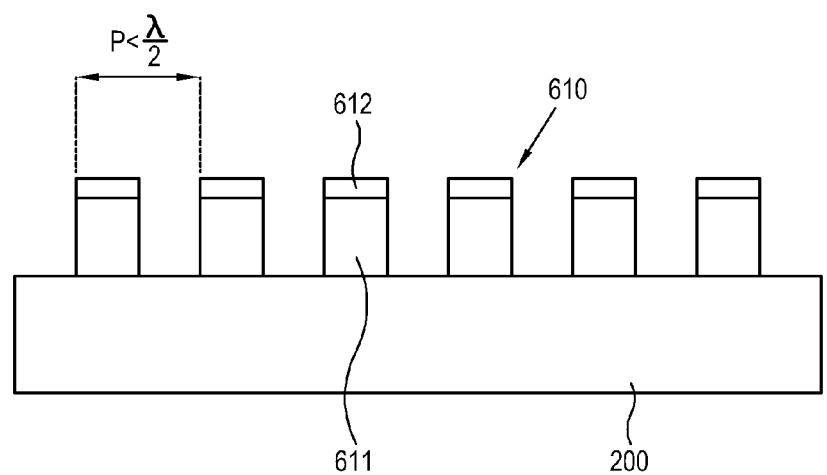
FIG. 6 is a cross-section view of a polarizing layer on a second substrate of FIG. 1.

FIG. 6 is a cross-section view of the polarizing layer on the second substrate of FIG. 1. As shown therein, the polarizing layer 600 includes the second metal linear grid 610 shaped like a bar arranged in a direction perpendicular to the first metal linear grid 310. That is, the second metal linear grid 610 transmits a second polarized component perpendicular to the first polarized component. The second metal linear grid 610 has a pitch capable of transmitting incident light of all wavelengths since it has only to transmit the second polarized component. Particularly, the pitch of the second metal linear grid 610 may be formed to be shorter than ½ of a blue light wavelength. In this exemplary embodiment, the second metal linear grid 610 has a height of about 150 nm and a pitch of 100 to 150 nm. Also, a ratio of height to width of the second metal linear grid 610 may be adjusted within a range from 2 to 4.

The second metal linear grid 610 includes a metal layer 611 and a hard mask 612 formed on the metal layer 611. The metal layer 611 may contain the same metal as or a different metal from that of the first metal linear grid 310. In other words, the metal layer 611 may contain metal such as Al, Ag, Cu, etc., or may contain MoW or the like hard alloy. Alternatively, the metal layer 611 may be made of a conductive polymer or may contain the conductive polymer. The hard mask 612 serves to protect the metal layer 611 and improve polarizing performance of the metal layer 611, and may contain a dielectric material such as $SiO_2$.

According to another exemplary embodiment, the first metal linear grid 310 and the second metal linear grid 610 may have the same polarizing direction. Since it can be set up such that the light is blocked out or transmitted in accordance with whether a voltage is applied or not by adjusting the state of the liquid crystal depending on an orientation, there is no need for making the polarizing directions of the first metal linear grid 310 and the second metal linear grid 610 be perpendicular to each other. This may be adjusted in accordance with the orientation of the liquid crystal.

Figure 7:
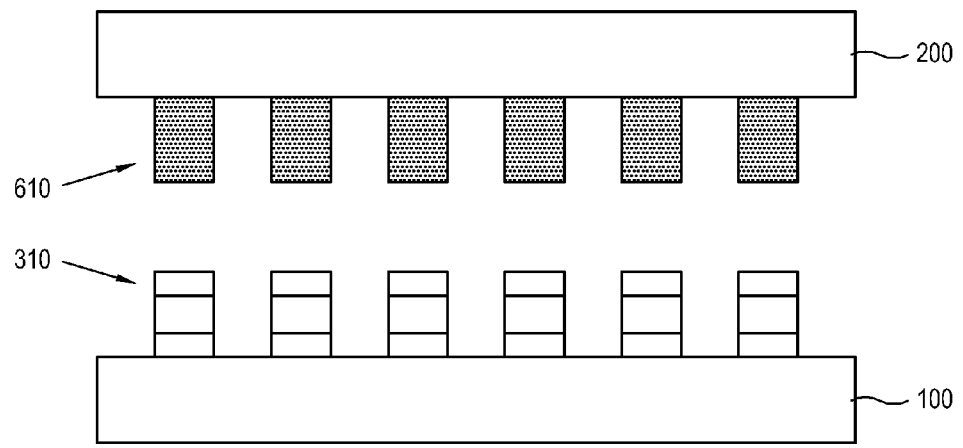
FIGS. 7 to 9 are views showing a color filter polarizing layer and a polarizing layer of a display panel according to another exemplary embodiment.
Figure 8:
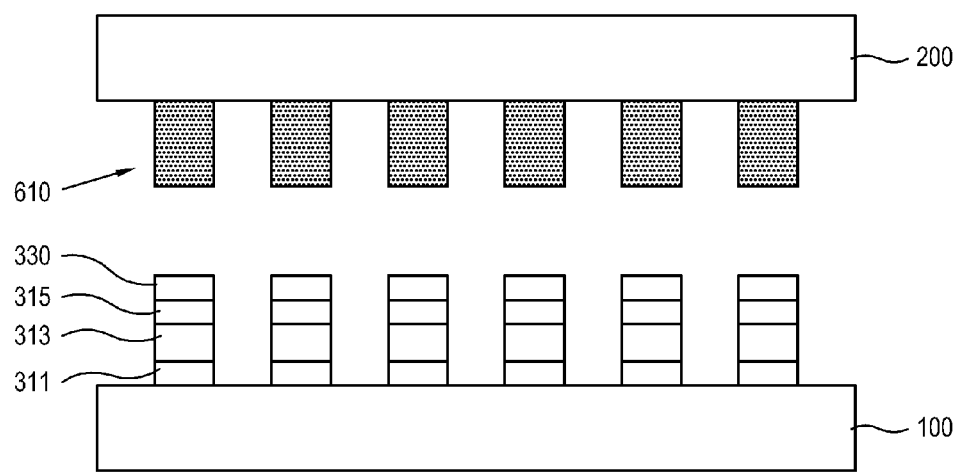
Figure 9:
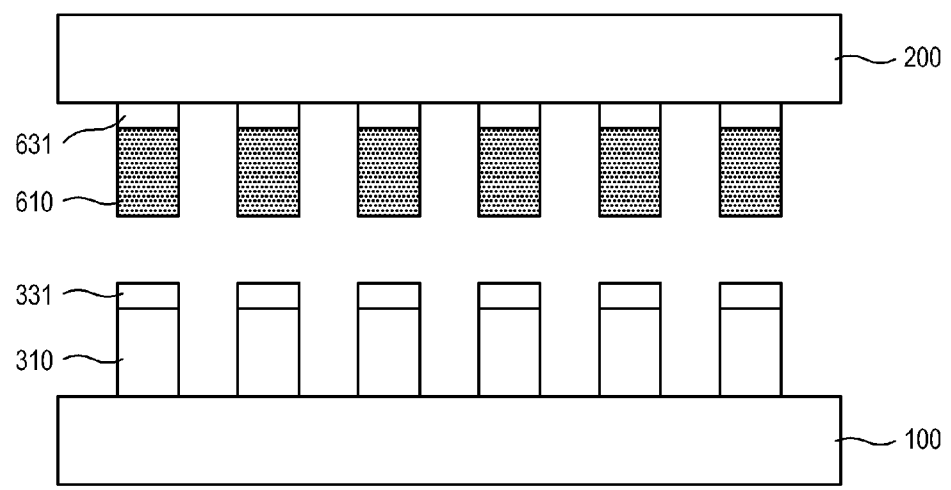

FIGS. 7 to 9 are views showing a color filter polarizing layer and a polarizing layer of a display panel according to another exemplary embodiment. The display panel 1000 of FIGS. 7 to 9 includes the first metal linear grid 310 and the second metal linear grid 610 different from each other in material, particularly, in metal material contained therein. The metal contained in the first metal linear grid 310 and the second metal linear grid 610 may be different from each other in reflectivity or hardness.

The display panel 1000 of FIG. 7 includes the first metal linear grid 310 containing metal of high reflectivity, and a second metal linear grid 610 containing metal of low reflectivity. If light enters through the bottom of the first substrate 100 and exits through the second substrate 200, the light of only the first polarized component enters the liquid crystal layer 500, and the light of the second polarized component is reflected from the first substrate 100. Typically, a backlight assembly (not shown) emitting light under the display panel 1000 includes a reflective plate that reflects light reflected from the first substrate 100 toward the display panel 1000 again. Metal contained in the first metal linear grid 310 may have high reflectivity so that more light can be recycled by the reflective plate and enter the first substrate 100, i.e., much more light of the second polarized component can enter the reflective plate. For example, the first metal linear grid 310 may include a metal having high reflectivity, such as Al, Ag, Cu, etc. Thus, if the highly-reflective metal causes the reflectivity of the first metal linear grid 310, it is possible to omit the dual brightness enhance film (DBEF) used in the conventional display panel. Accordingly, there is an effect on reducing production costs of the display panel 1000, and it is possible to make the display apparatus including the display panel 1000 thin and lightweight.

On the other hand, the second metal linear grid 610 may contain metal having low reflectivity so as to suppress reflection of external light and absorb the light. The second metal linear grid 610 may undergo additional processes for decreasing the reflectivity of the metal, or may include or be configured with carbon, chrome oxide, etc. for absorbing the light.

In the meantime, the second metal linear grid 610 according to another exemplary embodiment may include metal having high strength such as to absorb external impacts. For example, the second metal linear grid 610 may contain MoW or the like alloy, or may contain conductive polymer capable of performing substantially the same function as the metal layer.

The display panel 1000 of FIG. 8 may further include a light absorbing layer 330 formed on the first metal linear grid 310 included in the first substrate 100 and absorbing light. If external light enters the display panel 1000 and is reflected again, there are problems that a contrast ratio of the display panel 1000 may be lowered and picture quality may be deteriorated due to the reflection of light. To prevent these problems, the first substrate 100 according to this exemplary embodiment includes the light absorbing layer 330 on the first metal linear grid 310 in order to absorb undesired external light.

The light absorbing layer 330 may contain metal having low reflectivity, and or may include or be configured with carbon, chrome oxide, etc. for absorbing the light.

Alternatively, the light absorbing layer 330 may be formed not on the first substrate but beneath the second metal linear grid 610 of the second substrate 200. That is, the external light is intercepted by the light absorbing layer formed beneath the second metal linear grid 610 and thus prevented from entering the display panel 1000.

FIG. 9 shows a first light absorbing layer 331 formed on the first metal linear grid 310 of the first substrate 100 and a second light absorbing layer 631 formed on the second substrate 200. To reduce the problems associated with the reflection of the external light, the display panel 1000 according to this exemplary embodiment includes the light absorbing layers 331 and 631 disposed on both the first and second substrates 100 and 200. The light absorbing layers 331 and 631 may be configured with carbon, chrome oxide, etc. Of course, there is no limit to the material being used as long as the light absorbing layers 331 and 631 includes a material capable of absorbing the light.

The first light absorbing layer 331 and the second light absorbing layer 631 may be formed on either of the substrates as shown in FIG. 8, or may be omitted.

Figure 10:
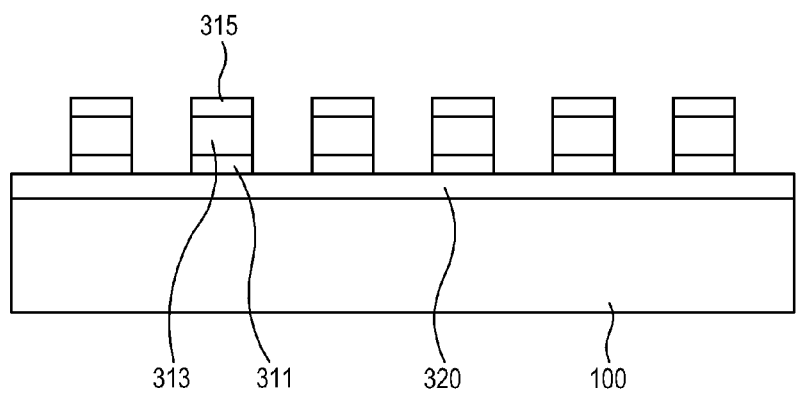
FIG. 10 is a cross-section view of another color filter polarizing layer according to an exemplary embodiment.

FIG. 10 is a cross-section view of another color filter polarizing layer according to an exemplary embodiment.

As shown therein, the color filter polarizing layer 300 may further include a dielectric layer 320 stacked under the first metal linear grid 310. The dielectric layer 320 may be made of a material similar to the first substrate 100, and may contain $MgF_2$. The dielectric layer 320 may be provided in the form of a film coupled to the first substrate 100. Here, the dielectric layer 320 may replace the first substrate 100 or may be omitted.

FIGS. 11A to 11D are views for explaining a manufacturing method for a first substrate of a display panel according to still another exemplary embodiment.

Figure 11A:
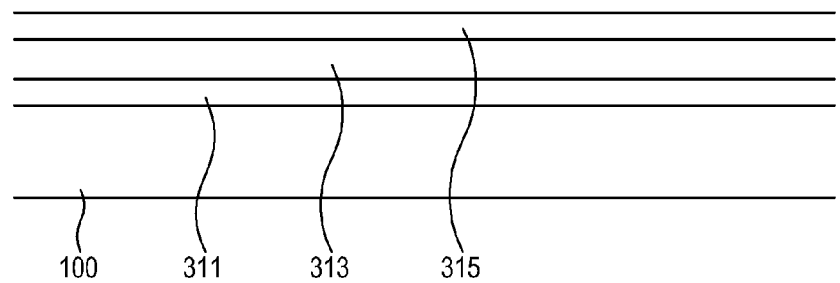
FIGS. 11A to 11D are views for explaining a manufacturing method for a first substrate of a display panel according to still another exemplary embodiment.

As shown in FIG. 11A, the first metal layer 311, the insulating layer 313 and the second metal layer 315 are stacked in sequence by a sputtering method or the like in order to form a color filter polarizing layer 300 on the first substrate 100.

Figure 11B:
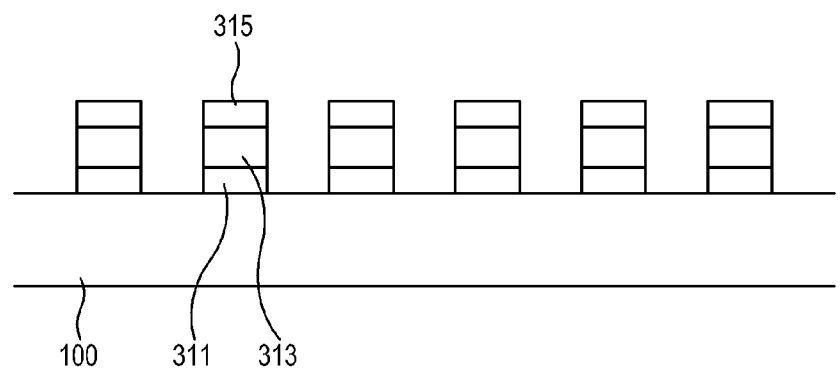

Then, as shown in FIG. 11B, a general patterning process is performed. In other words, photoresist is deposited, exposed to light through a mask, and developed and etched to thereby form the first metal linear grid 310. That is, in this exemplary embodiment, the first metal layer 311, the insulating layer 313 and the second metal layer 315 are not respectively formed but stacked in sequence and once patterned to form the first metal linear grid 310. The process of forming the first metal linear grid 310 may be achieved by any publicly-known or not-known patterning technique.

Figure 11C:
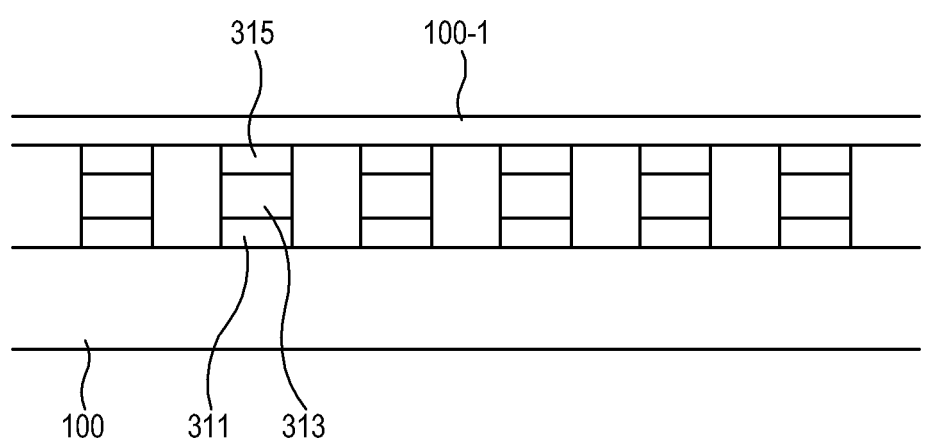

After forming the first metal linear grid 310, as shown in FIG. 11C, the planarization layer 100-1 is formed for protecting and leveling the surface of the first metal linear grid 310. The planarization layer 100-1 may contain silicon nitride $SiN_x$.

The TFT 411 and the pixel electrode 412 electrically connected to the TFT 411 are formed on the planarization layer 100-1. The pixel electrode 412 may be formed by depositing metal by the sputtering method and patterning it (refer to FIG. 11D).

FIG. 12A to 12D are views for explaining a manufacturing method for a second substrate of a display panel according to still another exemplary embodiment.

Figure 12A:
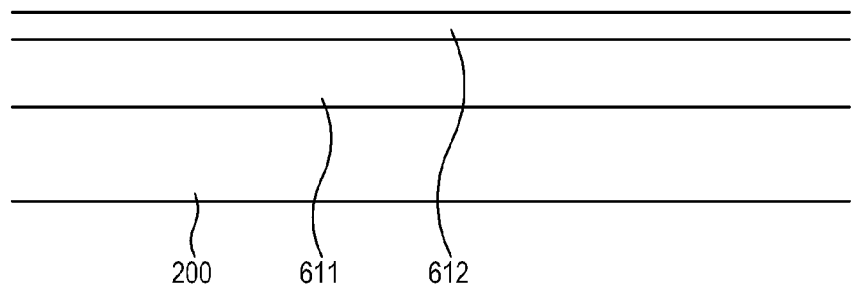
FIG. 12A to 12D are views for explaining a manufacturing method for a second substrate of a display panel according to still another exemplary embodiment.
Figure 12B:
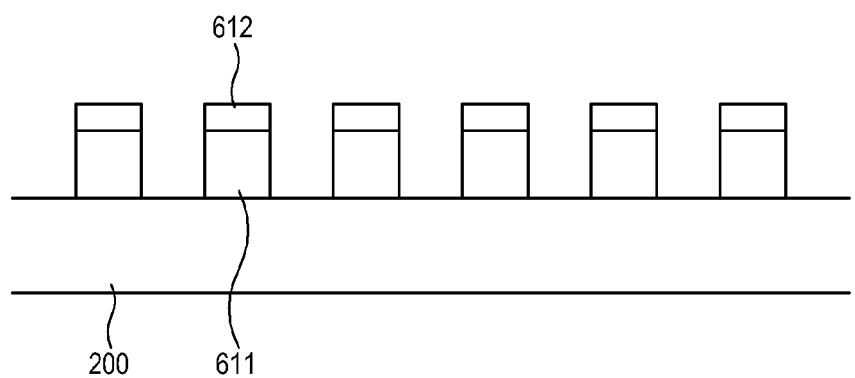

The polarizing layer 600 of the second substrate 200 may be formed by a method similar to that for the color filter polarizing layer 300 of the first substrate 100. That is, as shown in FIG. 12A, the metal layer 611 and the hard mask 612 for protecting the metal layer 611 are stacked on the second substrate 200.

Then, the second metal linear grid 610 is formed by performing a photolithography or etching process once.

Figure 12C:
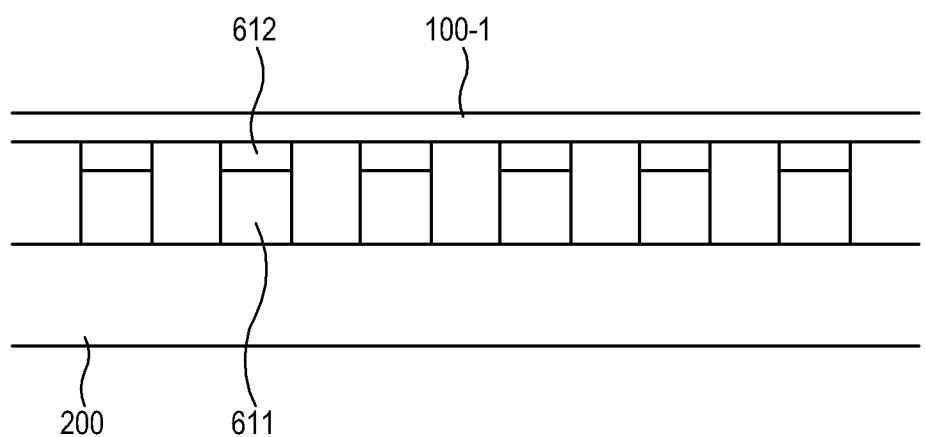

After forming the second metal linear grid 610, as shown in FIG. 12C, the planarization layer 100-1 for protecting and leveling the surface of the second metal linear grid 610 is formed.

Figure 12D:
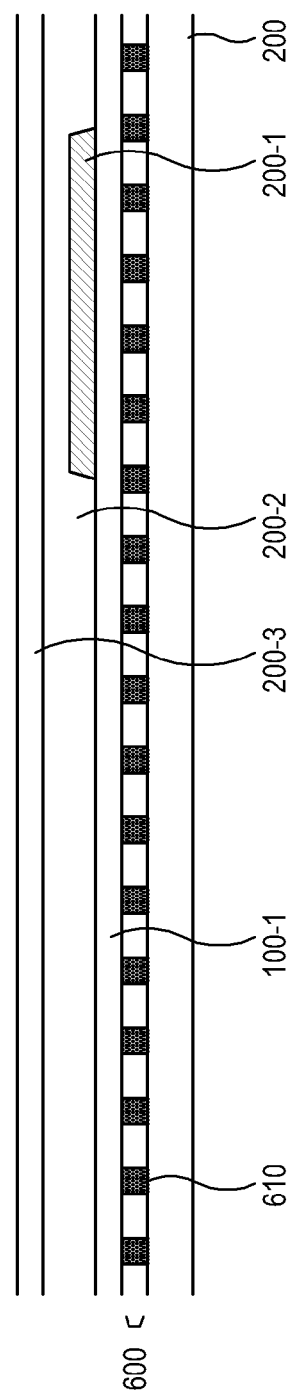

As shown in FIG. 12D, the black matrix 200-1 is formed on the planarization layer 100-1 in a region corresponding to the TFT 141, and the overcoat layer 200-2 is formed for leveling the black matrix 200-1. Further, the common electrode 200-3 containing a transparent conductive material is formed by a sputtering method.

Figure 11D:
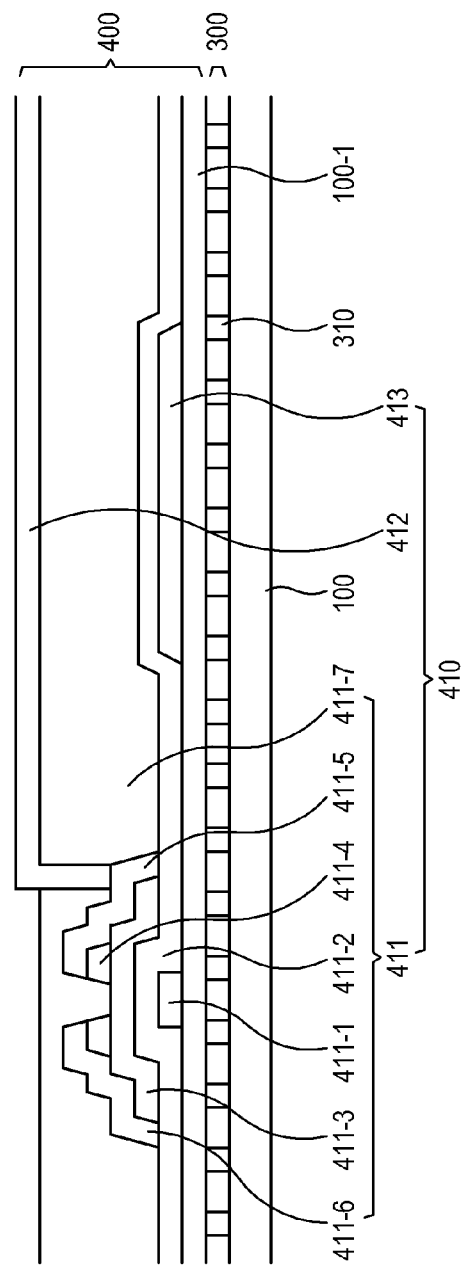

The two substrates 100 and 200 of FIGS. 12D and 11D are coupled and encapsulated with each other, and the liquid crystal is inserted therein, thereby completing the display panel 1000.

Figure 13A:
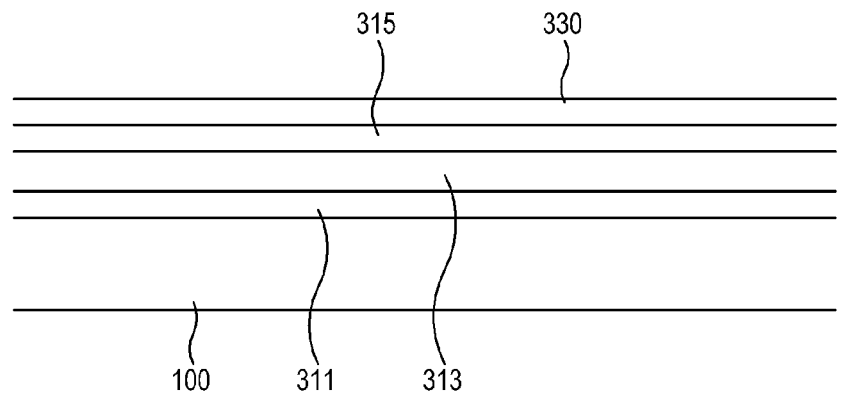
FIGS. 13A and 13B are views for explaining a forming method for a light absorbing layer according to an exemplary embodiment.
Figure 13B:
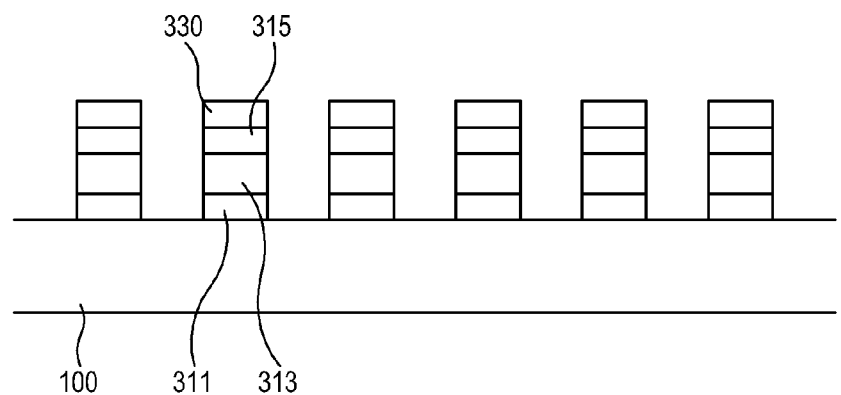

FIGS. 13A and 13B are views for explaining a forming method for a light absorbing layer according to an exemplary embodiment.

FIG. 13A shows that the first metal layer 311, the insulating layer 313, the second metal layer 315, and the light absorbing layer 330 are sequentially stacked on the first substrate.

Then, as shown in FIG. 13B, a patterning process is applied once to form the first metal linear grid 310 and the light absorbing layer 330.

Figure 14A:
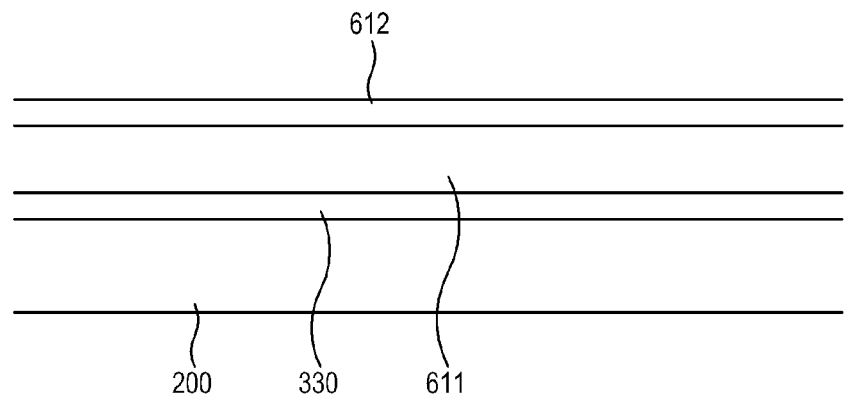
FIGS. 14A and 14B are views for explaining a forming method for a light absorbing layer according to another exemplary embodiment.
Figure 14B:
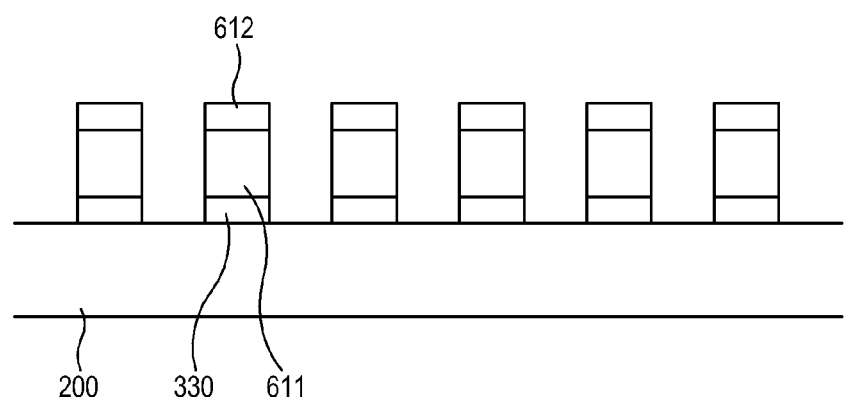

FIGS. 14A and 14B are views for explaining a forming method for a light absorbing layer according to another exemplary embodiment.

In this exemplary embodiment, the light absorbing layer 330 is formed beneath the second metal linear grid 610. As shown in FIG. 14A, the light absorbing layer 330, the metal layer 611 and a hard mask 612 are sequentially stacked on the second substrate 200.

Then, as shown in FIG. 14B, a patterning process is applied once to form the second metal linear grid 610 and the light absorbing layer 330.

Figure 15:
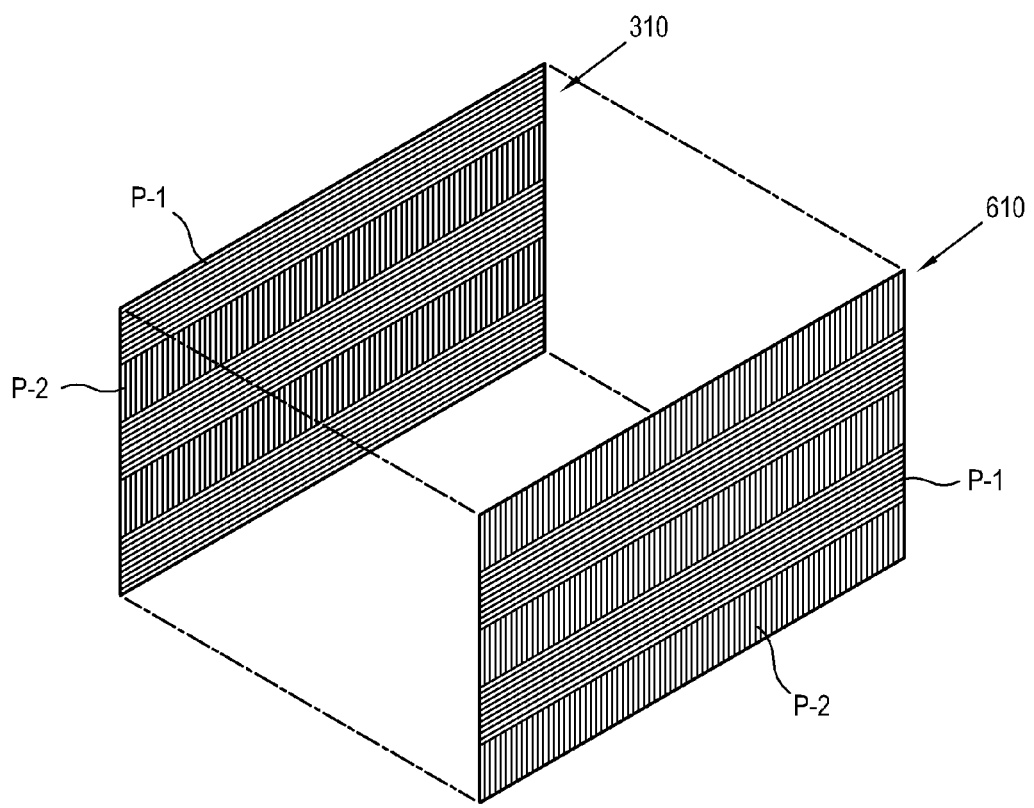
FIG. 15 is a view for explaining polarization of first and second metal linear grids of the display panel according to an exemplary embodiment.

FIG. 15 is a view for explaining polarization of first and second metal linear grids of the display panel according to an exemplary embodiment. The line shown in FIG. 15 schematically illustrates orientation of the first metal linear grid 310 formed on the color filter polarizing layer 300 and the second metal linear grid 610 formed on the polarizing layer 600. In accordance with the orientation, the polarized components of the transmitted light are different. For example, if a horizontal line transmits the first polarized component of the light, a vertical line transmits the second polarized component. The display panel 1000 according to this exemplary embodiment is useful to a display apparatus that displays a three-dimensional (3D) image, particularly, to a display apparatus that displays a 3D image in a passive mode. In the case of displaying the 3D image by the passive mode, a user can view an image through polarization glasses having different polarized states.

As shown therein, the color filter polarizing layer 300 is divided into a plurality of rows, and the first metal linear grid 310 includes a first polarizing linear grid P-1 for transmitting the first polarized component and a second polarizing linear grid P-2 for transmitting the second polarized component. The first polarizing linear grid P-1 is formed in odd-numbered rows and the second polarizing linear grid P-2 is formed in even-numbered rows, which are alternate to each other. Likewise, the second metal linear grid 610 includes the first polarizing linear grid P-1 for transmitting the first polarized component and the second polarizing linear grid P-2 for transmitting the second polarized component. However, contrary to the first metal linear grid 310, the first polarizing linear grid P-1 of the second metal linear grid 610 is formed in even-numbered rows and the second polarizing linear grid P-2 is formed in odd-numbered rows, which alternate to each other.

In other words, the first polarizing linear grid P-1 of the second metal linear grid 610 is formed to correspond to the second polarizing linear grid P-2 of the first metal linear grid 310, and the second polarizing linear grid P-2 of the second metal linear grid 610 is formed to correspond to the first polarizing linear grid P-1 of the first metal linear grid 310, which alternate to each other.

If a video signal corresponding to a left-eye image and a video signal corresponding to a right-eye image are alternately applied to the odd-numbered rows and the even-numbered rows, respectively, the left-eye image is displayed on the display panel 1000 through the first polarizing linear grid P-1 of the first metal linear grid 310 and the second polarizing linear grid P-2 of the second metal linear grid 610, and the right-eye image is displayed on the display panel 1000 through the second polarizing linear grid P-2 of the first metal linear grid 310 and the first polarizing linear grid P-1 of the second metal linear grid 610. Although the left-eye image and the right-eye image are simultaneously displayed on the display panel 1000, a user's two eyes respectively view different images through the polarization glasses that can transmit only one polarized component of the left-eye and right-eye images, thereby viewing the 3D image.

The repeated cycle of the first polarizing linear grid P-1 and the second polarizing linear grid P-2 may be based on one pixel row or a plurality of pixel rows.

Alternatively, the color filter polarizing layer 300 may be divided into a plurality of columns, and the first polarizing linear grid P-1 and the second polarizing linear grid P-2 may be alternately formed at every column.

Figure 16:
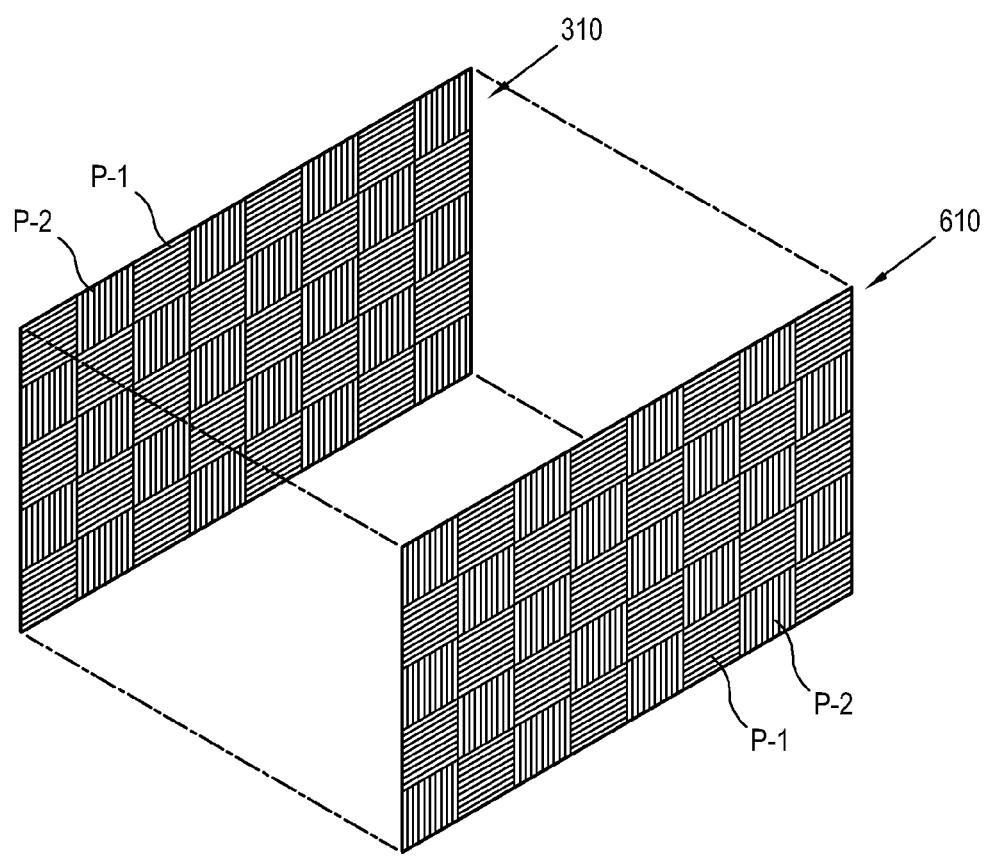
FIG. 16 is a view for explaining polarization of first and second metal linear grids of the display panel according to another exemplary embodiment.

FIG. 16 is a view for explaining polarization of first and second metal linear grids of the display panel according to another exemplary embodiment.

As shown therein, the color filter polarizing layer 300 in this exemplary embodiment is divided in form of a checkerboard, and the first polarizing linear grid P-1 and the second polarizing linear grid P-2 are alternately formed in adjacent cells on the checkerboard. Of course, the first polarizing linear grid P-1 of the first metal linear grid 310 corresponds to the second polarizing linear grid P-2 of the second metal linear grid 610, and the second polarizing linear grid P-2 of the first metal linear grid 310 corresponds to the first polarizing linear grid P-1 of the second metal linear grid 610.

In this case, the left-eye image and the right-eye image may be alternately displayed in the adjacent cells of the checker board, and a user can view the 3D image through the same polarization glasses as those of the foregoing exemplary embodiment. In this exemplary embodiment, an image having resolution substantially lower than that of the display panel 1000 is displayed, but the left-eye image and the right-eye image are repeated in a grid pattern so that a user cannot sense decrease in the resolution. That is, a user can view an image having higher resolution than that of the exemplary embodiment shown in FIG. 15.

The cells of the checkerboard may correspond to individual pixels of the pixel layer 400, and may correspond to a plurality of pixels.

Further, the display panel 1000 of FIGS. 15 and 16 may externally include a polarizer for changing linearly polarized light transmitted through the polarizing layer 600 into circularly polarized light. To secure a viewing angle and enable a user to view a 3D image even though a user views it in any direction, the display panel 1000 may emit the circularly polarized light.

Figure 17:
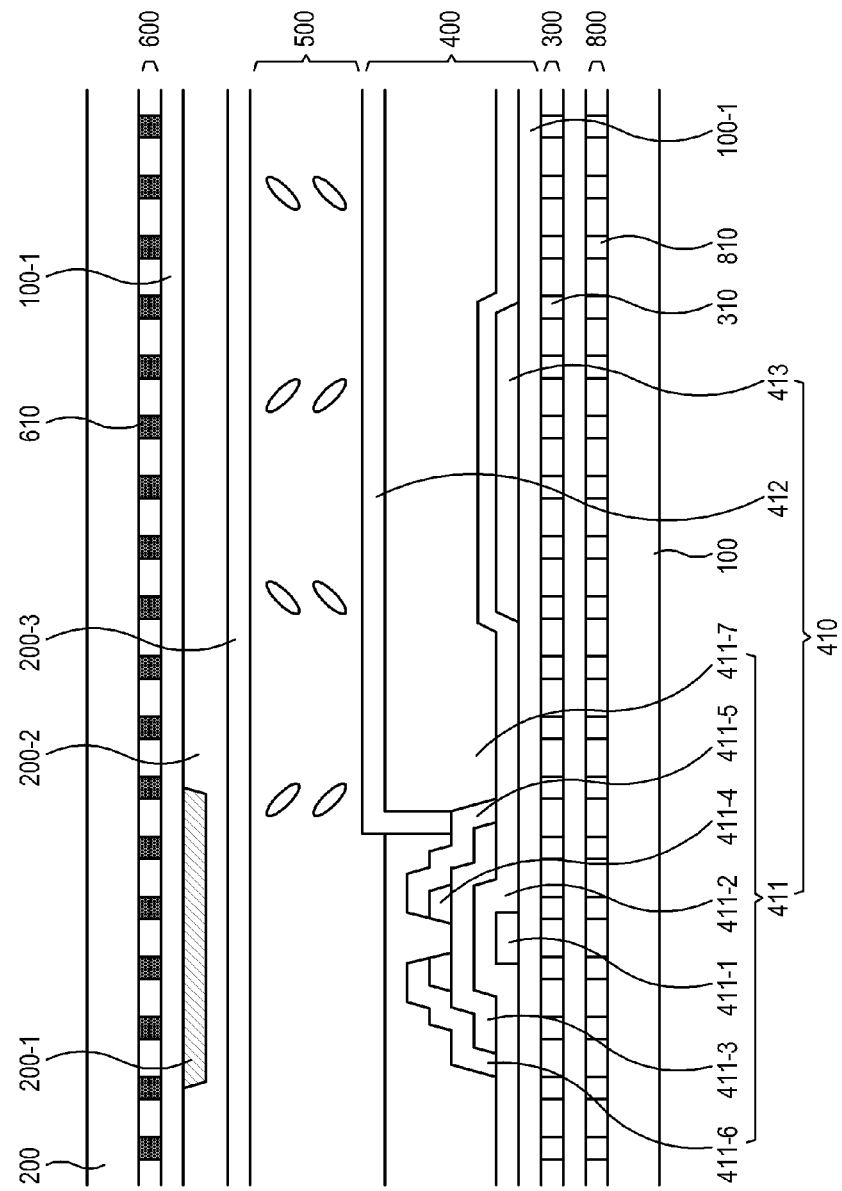
FIG. 17 is a cross-section view of a display panel according to another exemplary embodiment.

FIG. 17 is a cross-sectional view of a display panel according to another exemplary embodiment.

The display panel 1000 in this exemplary embodiment further includes an additional polarizing layer 800 beneath the color filter polarizing layer 300 to transmit the first polarizing component. The additional polarizing layer 800 may further include a third metal linear grid 810 that contains substantially the same metal as the metal contained in the second metal linear grid 610 and is arranged in the same direction as the first metal linear grid 310. The third metal linear grid 810 is arranged in the same direction as the first metal linear grid 310, and thus transmits the first polarized component. The light of the first polarized component passed through the additional polarizing layer 800 is emitted with red, blue and green colors while passing through the color filter polarizing layer 300.

The metal layer contained in the third metal linear grid 810 may contain highly-reflective metal, e.g., at least one of Al, Ag and Cu. Further, a light absorbing layer may be further provided on the metal layer and absorb external light.

Figure 18A:
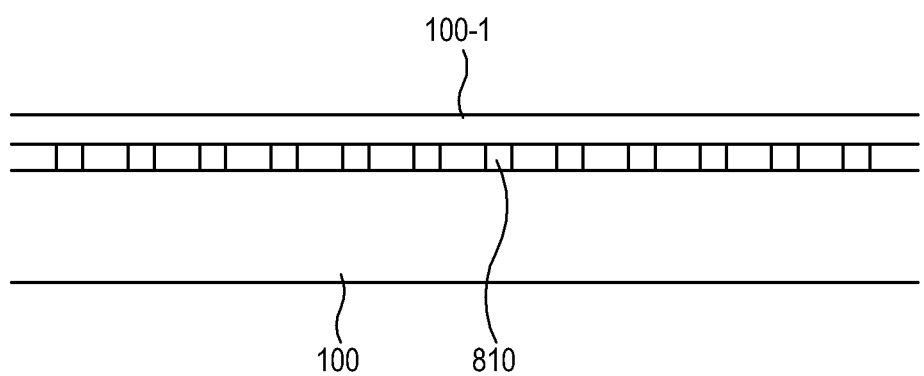
FIGS. 18A and 18B are views for explaining a forming method for an additional polarizing layer according to an exemplary embodiment.
Figure 18B:
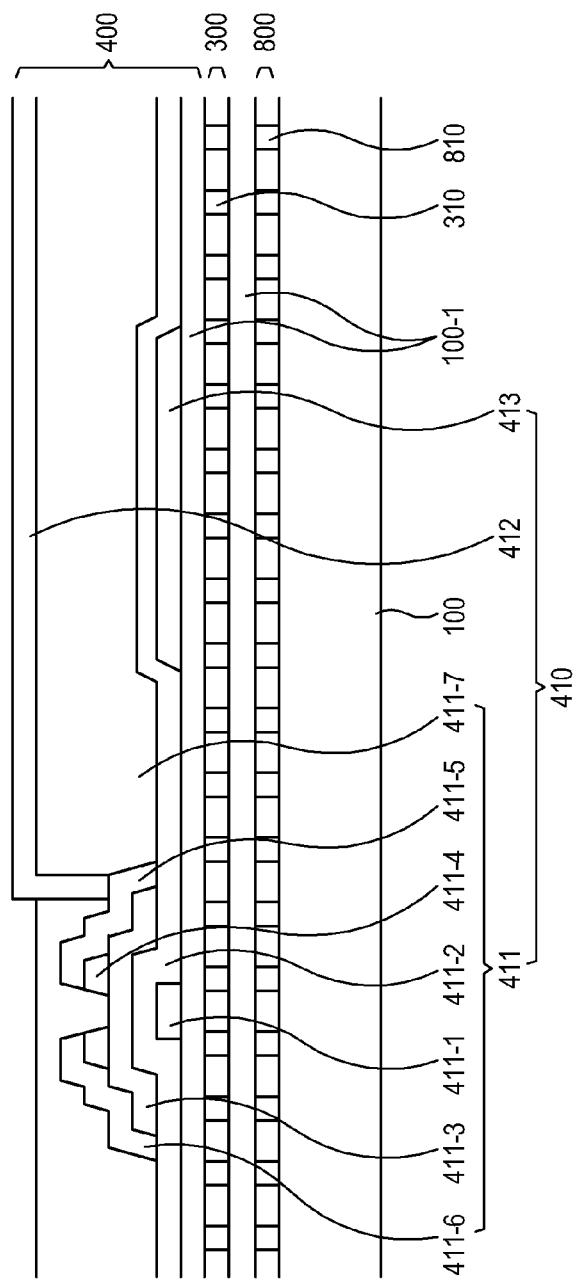

FIGS. 18A and 18B are views for explaining a forming method for an additional polarizing layer according to an exemplary embodiment.

As shown in FIG. 18A, first, the additional polarizing layer 800 including the third metal linear grid 810 is formed on the first substrate 100, and the polarization layer 100-1 is formed on the additional polarizing layer 800.

Then, as shown in FIG. 18B, the color filter polarizing layer 300 and the pixel layer 400 are sequentially formed. If the second substrate 200 is formed as shown in FIG. 12D and then combined to FIG. 18B, the display panel 1000 including the additional polarizing layer 800, the color filter polarizing layer 300 and the polarizing layer 600 is completed.

Figure 19:
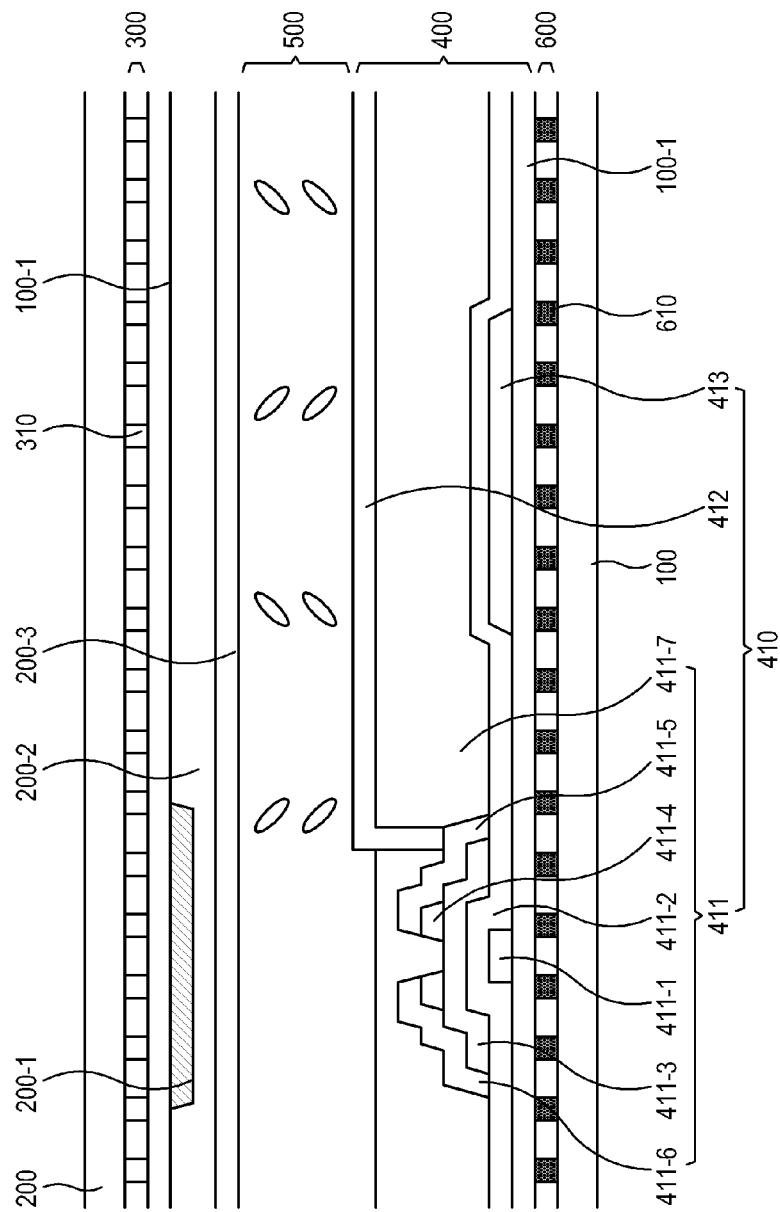
FIG. 19 is a cross-section view of a display panel according to still another exemplary embodiment.

FIG. 19 is a cross-section view of a display panel according to still another exemplary embodiment.

As shown therein, the display panel 1000 according to this exemplary embodiment includes a polarizing layer 600 formed on the first substrate 100, and a color filter polarizing layer 300 formed on the second substrate 200. In other words, the color filter polarizing layer 300 may be arranged on not the pixel layer 400 but the substrate formed with the black matrix 200-1. If light enters through the bottom of the first substrate 100, the light of second polarized component passed through the polarizing layer 600 passes through the liquid crystal layer 500, and is then emitted as the light of the first polarized component with different colors while passing through the color filter polarizing layer 300. Each of the color filter polarizing layer 300 and the polarizing layer 600 may be selectively formed on the same or different substrates as the pixel electrode 400. Of course, light may enter though the second substrate 200 and exit through the first substrate 100.

Figure 20:
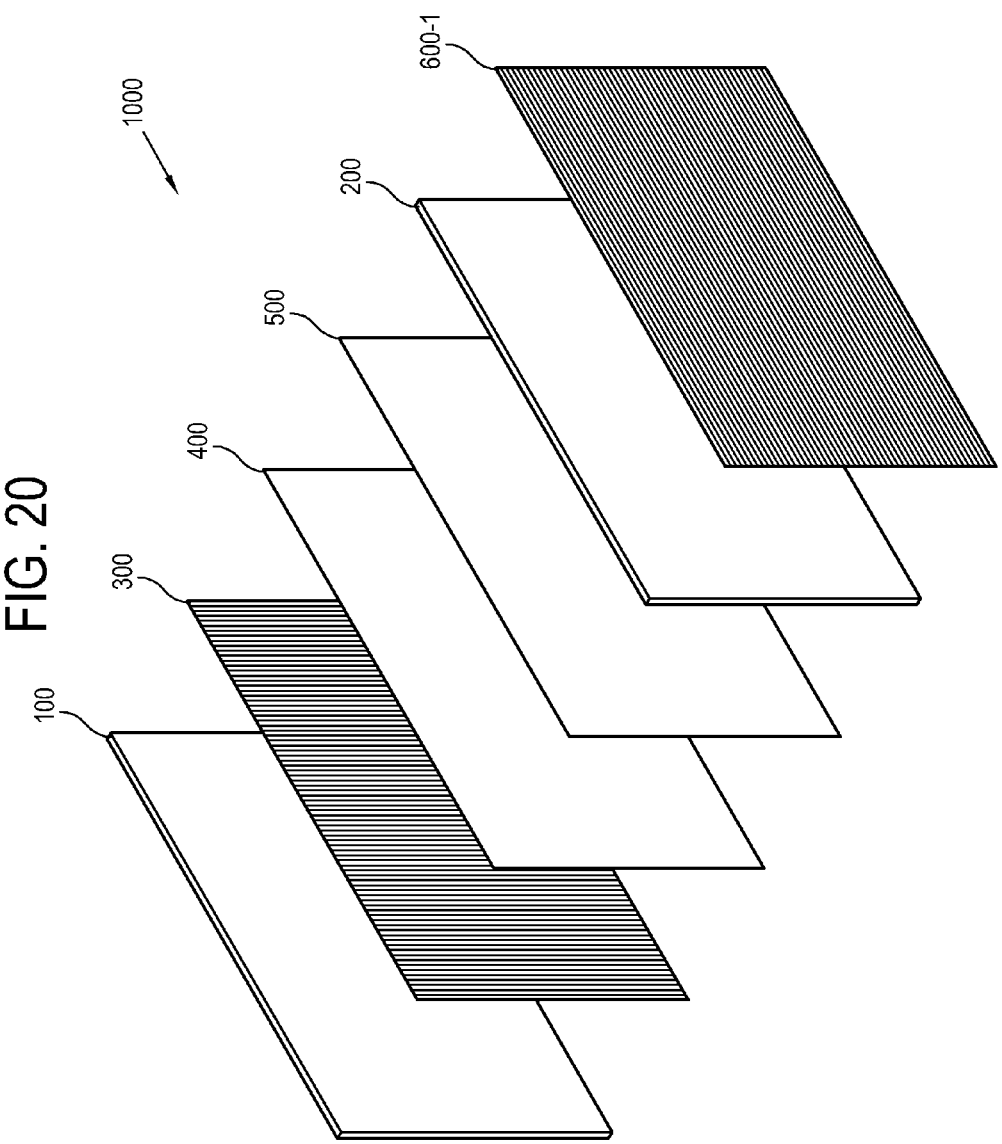
FIG. 20 is a view showing a layer structure of a display panel according to still another exemplary embodiment.
Figure 21:
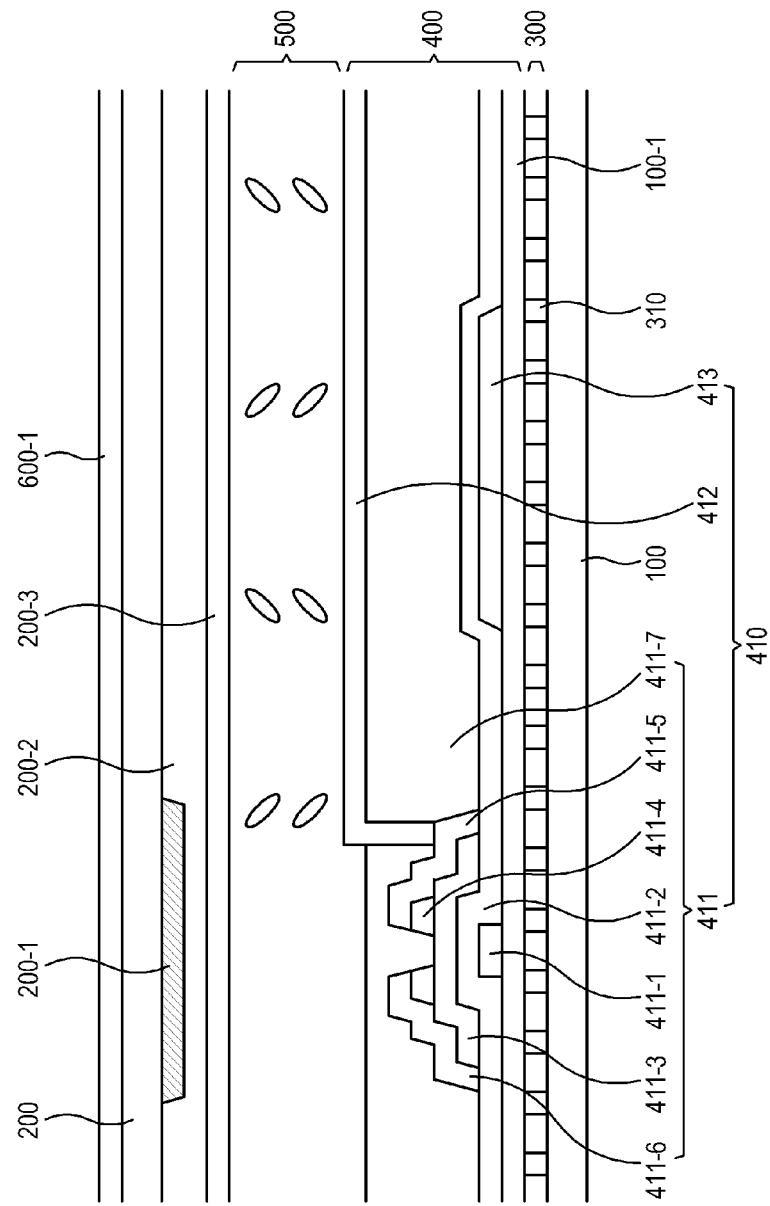
FIG. 21 is a cross-section view of the display panel of FIG. 20.

FIG. 20 is a view showing a layer structure of a display panel according to still another exemplary embodiment, and FIG. 21 is a cross-section view of the display panel of FIG. 20.

As shown therein, the display panel 1000 in this exemplary embodiment includes first and second substrates 100 and 200 disposed opposite to each other; a color filter polarizing layer 300, the pixel layer 400 and the liquid crystal layer 500 sequentially arranged between the first and second substrates; and a polarizing film 600-1 arranged on an outside surface of the second substrate 200.

The polarizing film 600-1 transmits light of a second polarized component different from the first polarized component, and replaces the polarizing layer 600 included in the foregoing exemplary embodiment.

Alternatively, the polarizing film 600-1 may be attached to the outside surface of the first substrate 100, and the color filter polarizing layer 300 may be formed on the second substrate 200. In other words, the color filter polarizing layer 300 may be arranged on not the pixel layer 400 but the substrate formed with the black matrix 200-1. If light enters through the bottom of the first substrate 100, the light of second polarized component passed through the polarizing film 600-1 passes through the liquid crystal layer 500, and then exits as the light of the first polarized component with different colors while passing through the color filter polarizing layer 300. Each of the color filter polarizing layer 300 and the polarizing film 600-1 may be selectively formed on the same or different substrates as the pixel electrode 400. Of course, light may enter though the second substrate 200 and exit through the first substrate 100.

Figure 22:
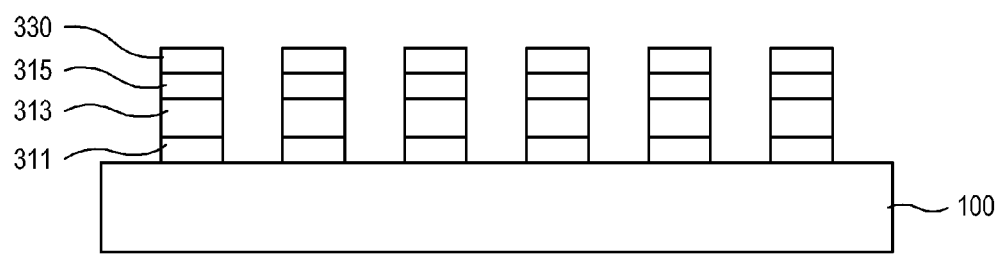
FIG. 22 is a cross-section view showing an exemplary embodiment of the color filter polarizing layer of FIG. 20.

FIG. 22 is a cross-section view showing an exemplary embodiment of the color filter polarizing layer of FIG. 20.

As shown therein, the display panel 1000 may further include a light absorbing layer 330 formed on the first metal linear grid 310 included in the first substrate 100 and absorbing light. If external light enters the display panel 1000 and is reflected again, there are problems that a contrast ratio of the display panel 1000 may be lowered and picture quality may be deteriorated due to the reflection of light. To prevent these problems, the first substrate 100 according to this exemplary embodiment includes the light absorbing layer 330 on the first metal linear grid 310 in order to absorb undesired external light.

The light absorbing layer 330 may contain metal having low reflectivity, and or may include or be configured with carbon, chrome oxide, etc. for absorbing the light.

Figure 23:
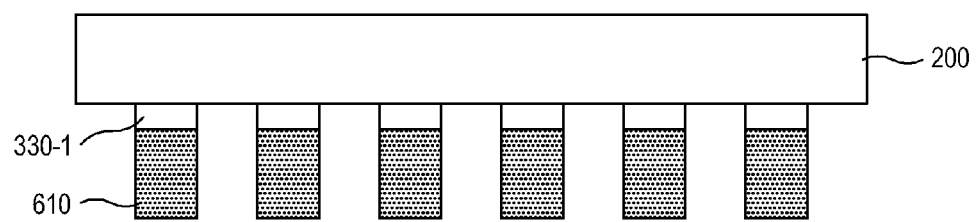
FIG. 23 is a cross-section view showing another exemplary embodiment of the color filter polarizing layer of FIG. 20.

FIG. 23 is a cross-section view showing another exemplary embodiment of the color filter polarizing layer of FIG. 20.

As shown therein, a light absorbing layer 330-1 may be formed on not the first substrate 100 but the second substrate 200. That is, incident light from the exterior is intercepted by the light absorbing layer 330-1 and prevented from entering the display panel 1000.

As shown in FIGS. 22 and 23, the light absorbing layer 330, 330-1 may be selectively formed on one of the first substrate 100 and the second substrate 200 in accordance with whether the light enters the first substrate 100 or the second substrate 200 of the display panel 1000.

Alternatively, the color filter polarizing layer 300 may further include a dielectric layer (not shown) stacked under the first metal linear grid 311. The dielectric layer may be made of a material similar to the first substrate 100, and may contain $MgF_2$. The dielectric layer may be provided in the form of a film coupled to the first substrate 100, and the dielectric layer may replace the first substrate 100 or be omitted. Here, the dielectric layer 320 may replace the first substrate 100 or may be omitted.

The display panel 1000 according to the foregoing exemplary embodiment may further include a printed circuit board mounted with a gate driving integrated chip (IC) and a data chip film package, which are not shown. Also, a compensation film (not shown) may be further provided outside the first substrate 100 and the second substrate 200.

Figure 24:
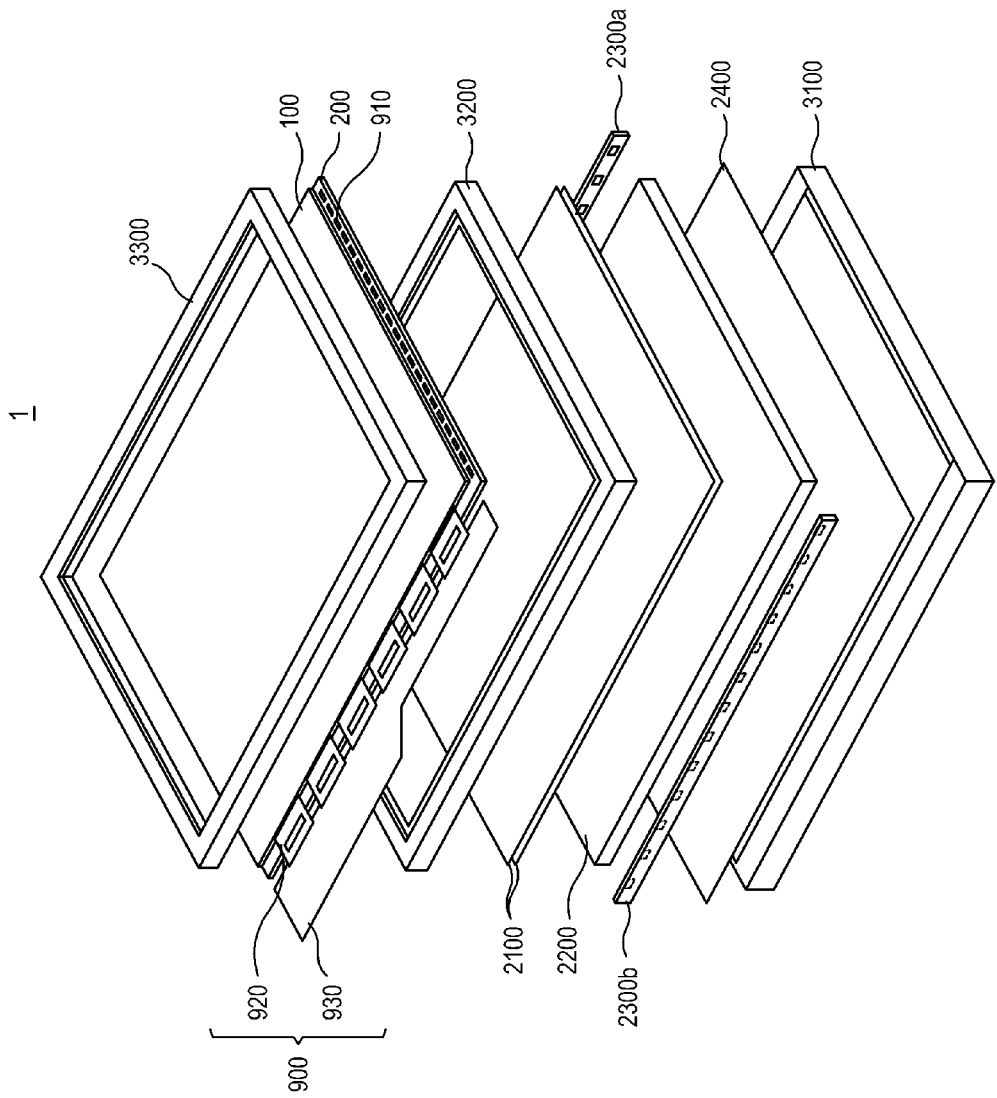
FIG. 24 is a schematic view of a display apparatus according to an exemplary embodiment.
Figure 25:
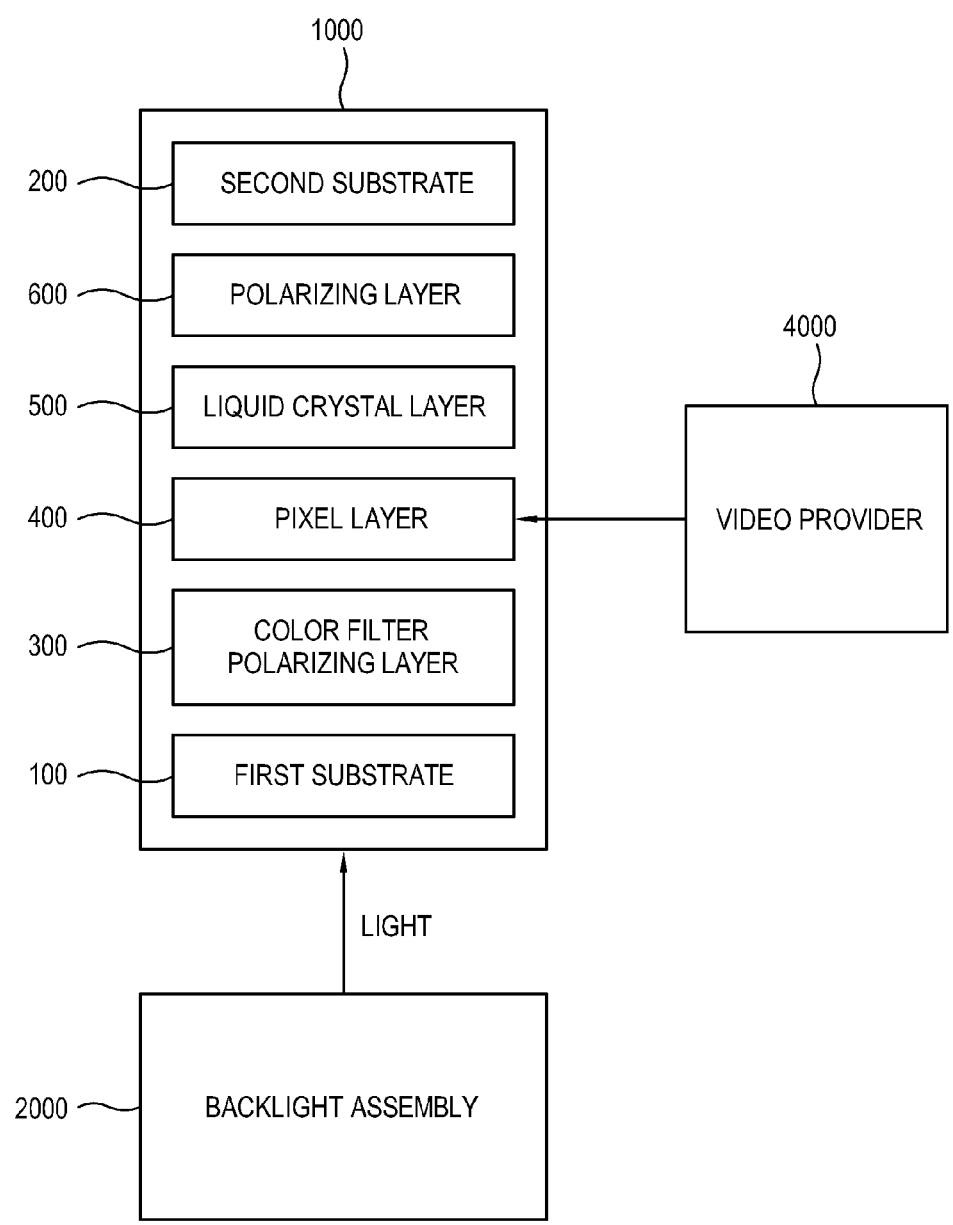
FIG. 25 is a control block diagram of a display apparatus according to an exemplary embodiment.

FIG. 24 is a schematic view of a display apparatus according to an exemplary embodiment, and FIG. 25 is a control block diagram of a display apparatus according to an exemplary embodiment.

As shown therein, the display apparatus 1 includes the display panel 1000, the backlight assembly 2000, accommodating containers 3100, 3200, 3300 accommodating them, and a video provider 4000.

The display panel 1000 includes the first substrate 100, the second substrate 200 opposite to the first substrate 100, the liquid crystal layer (not shown) interposed between the first substrate 100 and the second substrate 200, and a panel driver 900 for driving the pixel layer 400 to display a video signal. The panel driver 900 may include a gate driving IC 910, a data chip film package 920, and a printed circuit board 930.

The first substrate 100 and the second substrate 200 may be formed with the pixel layer 400, the color filter polarizing layer 300, the polarizing layer 600, the black matrix 200-1, the common electrode 200-3, etc. The color filter polarizing layer 300 polarizes the incident light entering the first substrate 100, and the polarizing layer 600 polarizes light exiting through the display panel 1000.

The display panel 1000 receives external light and controls intensity of light passing through the liquid crystal layer interposed between the first substrate 100 and the second substrate 200, thereby displaying an image.

The gate driving IC 910 is integrated and formed on the first substrate 100, and connected to each gate line (not shown) formed on the first substrate 100. Further, the data chip film package 920 may be connected to each data line (not shown) formed on the first substrate 100. Here, the data chip film package 920 may include a tape automated bonding (TAB) tape where a semiconductor chip is adhered to a wiring pattern formed on a base film by TAB technology. As an example of the chip film package, a tape carrier package (TCP), a chip on film (COF), etc. may be used.

Meanwhile, the printed circuit board 930 may be mounted with driving components for inputting a gate driving signal to a gate driving IC 931 and for inputting a data driving signal to a data chip film package 920.

The backlight assembly 2000 may include a light guide plate 2200 for guiding light, first and second light sources 2300a and 2300b for emitting light, a reflective sheet 2400 placed beneath the light guide plate 2200, and one or more optical sheets 2100.

The light guide plate 2200 serves to guide the light to be supplied to the display panel 1000. The light guide plate 2200 may be made of transparent plastic panel such as acryl, and guide light emitted from the first and second light sources 2300a and 2300b to travel toward the display panel 1000 formed on the light guide plate 2000. On the rear of the light guide plate 2200, there may be various patterns for changing a traveling direction of the light entering the inside of the light guide plate 2200 toward the display panel 1000.

As shown in the drawing, the first light source 2300a and the second light source 2300b may include a light emitting diode (LED) as a point light source. The light source is not limited to the LED, and may include a line light source such as a cold cathode fluorescent lamp (CCFL) or a hot fluorescent lamp (HCFL). The first light source 2300a and the second light source 2300b are electrically connected with an inverter (not shown) supplying power, and receive the power.

The reflective sheet 2400 is provided under the light guide plate 2200 and reflects the light emitted under the light guide plate 2200 upward. Specifically, the light, which is not reflected by a fine dot pattern formed on the back of the light guide plate 2200, is reflected again toward the light guide plate 2200, thereby decreasing loss in the light entering the display panel 1000 and enhancing uniformity of light transmitting through the exiting surface of the light guide plate 2200.

One or more optical sheets 2100 are provided on the top of the light guide plate 2200 and serve to diffuse and condense the light transmitted from the light guide plate 2200. The optical sheets 2100 may include a diffusion sheet, a prism sheet, a protection sheet, etc. The diffusion sheet may be placed between the light guide plate 2200 and the prism sheet, and diffuse incident light from the light guide plate 2200 to thereby prevent the light from being partially concentrated. The prism sheet may include triangular prisms regularly arranged on the top thereof, and serve to condense the light diffused by the diffusion sheet in a direction perpendicular to the display panel 1000. The protection sheet may be formed on the prism sheet, to protect the surface of the prism sheet, and diffuse and thus uniformly distribute the light.

The accommodating container may include a lower accommodating container 3100, a middle accommodating container 3200 and an upper accommodating container 3300. The lower accommodating container 3100 may accommodate the reflective sheet 2400, the first and second light sources 2300a and 2300b, the light guide plate 2200, and one or more optical sheets 2100. The lower accommodating container 3100 may be made of metal to have strength against external shock and ground ability.

The video provider 4000 connects with the display panel 1000 and provides a video signal. Although it is not shown in FIG. 24, the video provider 4000 may be arranged on the reflective sheet 2400 and the lower accommodating container 3100, or may be placed on the rear of the lower accommodating container 3100.

Figure 26:
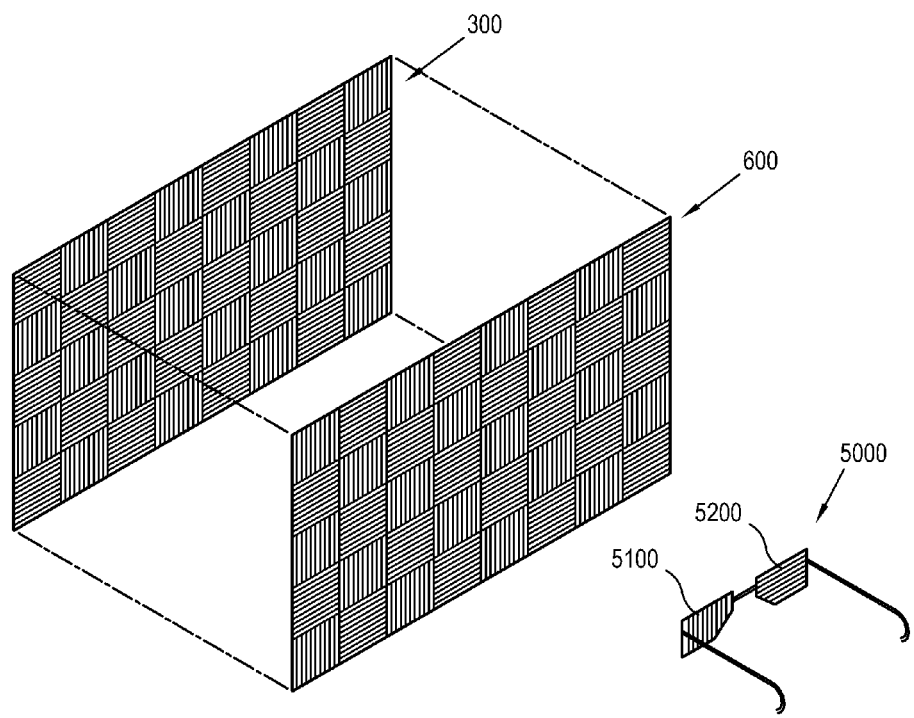
FIG. 26 is a view of explaining display of a three-dimensional image (3D image) in a display apparatus according to an exemplary embodiment.

FIG. 26 is a view for explaining the displaying of a three-dimensional (3D) image in a display apparatus according to an exemplary embodiment.

FIG. 26 illustrates the color filter polarizing layer 300 provided in the form of a checkerboard, the polarizing layer 600 and a polarization glasses 5000. The display apparatus according to this exemplary embodiment includes the display panel 1000, and the polarization glasses 5000 for respectively viewing the left-eye image and the right-eye image displayed on the display panel 1000.

The polarization glasses 5000 includes a left-eye lens 5100 and a right-eye lens 5200 which respectively transmit polarized components perpendicular to each other, i.e., the first polarized component and the second polarized component. The left-eye lens 5100 and the right-eye lens 5200 transmit differently polarized light, respectively. Thus, the light transmitted to the left-eye lens 5100 cannot be transmitted the right-eye lens 5200, and the light transmitted to the right-eye lens 5200 cannot be transmitted the left-eye lens 5100.

In this exemplary embodiment, the video provider 4000 applies left-eye image data and right-eye image data to the sub pixel 410 corresponding to the cells so that the left-eye image and the right-eye image can be alternately displayed on the adjacent cells of the checkerboard. The left-eye image and the right-eye image can transmit only one of the two lenses 5100 and 5200 in accordance with the polarized state. Thus, a user combines the left-eye image and the right-eye image viewed through his/her two eyes and senses it as the 3D image.

On the outer surface of the second substrate where the light exits, the polarizer may be provided for changing the linearly polarized light into circularly polarized light. Also, the polarization glasses 5000 may include a circular-polarization polarizer for transmitting the circularly polarized light.

In the display apparatus according to this exemplary embodiment, the first metal linear grid 310 and the second metal linear grid 610 are formed in the display panel 1000 in the form of the checkerboard, thereby facilitating realization of a passive-type 3D image. In the case of displaying a 3D image in the passive mode, the left-eye image and the right-eye image have to be spatially divided. At this time, if the polarizing film is used, there are shortcomings that the resolution of the image is lowered. The display panel 1000 in this exemplary embodiment can change a polarized state into a checkerboard form, so that a high-quality 3D image can be provided without lowering the resolution a user feels.

The display panel 1000 included in the display apparatus according to this exemplary embodiment may display the left-eye image and the right-eye image by a timesharing in accordance with shutter-type glasses. Also, the polarized state of the display panel 1000 may be changed with respect to rows or columns as shown in FIG. 15.

FIG. 27 is a view for explaining a manufacturing method of the display apparatus of FIG. 26.

First, at operation S10, the first polarizing linear grid P-1 transmitting the first polarizing component and the second polarizing linear grid P-2 transmitting the second polarizing component are provided in the form of the checkerboard on the first substrate 100, thereby forming the color filter polarizing layer 300. The first metal linear grids 310 of the color filter polarizing layer 300 are arranged with different pitches so as to emit light of different colors such as red, green and blue. The red metal linear grid is arranged such that every pitch is shorter than ½ of a red light wavelength and is formed corresponding to the sub pixel 410 for emitting red light, the green metal linear grid is arranged such that every pitch is shorter than ½ of a green light wavelength and is formed corresponding to the sub pixel 410 for emitting green light, and the blue metal linear grid is arranged such that every pitch is shorter than ½ of a blue light wavelength and is formed corresponding to the sub pixel 410 for emitting blue light. The first metal linear grid 310 is formed by sequentially stacking and patterning the first metal layer 311, the insulating layer 313 and the second metal layer 315.

On the top of the first metal linear grid 310, the light absorbing layer 330 may be formed to absorb not the light from the backlight assembly 2000 but the incident light from the exterior.

Then, at operation S20, the polarizing layer 600 is formed on the second substrate 200 so that the first polarizing linear grid P-1 can correspond to the second polarizing linear grid P-2 of the color filter polarizing layer 300 and the second polarizing linear grid P-2 can correspond to the first polarizing linear grid P-1 of the color filter polarizing layer 300.

At operation S30, the pixel layer 400 including a plurality of sub pixels 410 is formed on the top of either of the color filter polarizing layer 300 or the polarizing layer 600. If the pixel layer 400 is formed on the same substrate as the color filter polarizing layer 300, the pixel layer 400 may be formed before the polarizing layer 600 is formed. If the pixel layer 400 is formed on the same substrate as the polarizing layer 600, the pixel layer 400 may be formed before the color filter polarizing layer 300 is formed.

Next, at operation S40, the first substrate 100 and the second substrate 200 are encapsulated, and the liquid crystal is injected in a space formed between the first and second substrates.

The video provider 4000 capable of supplying video data to the sub pixels 410 and the panel driver 900 for driving the pixel layer 400 are connected to the substrate, and the left-eye image data and the right-eye image data are applied to the sub pixels 410 so that the left-eye image and the right-eye image can be alternately displayed in the adjacent cells of the checkerboard. Accordingly, a user combines the left-eye image and the right-eye image viewed through the polarization glasses 5000 and thus senses the images as the 3D image.

As described above, according to an exemplary embodiment, there are provided a display panel and a display apparatus comprising the same, in which manufacturing costs are decreased and a manufacturing process is simplified.

According to another exemplary embodiment, there are provided a display panel having improved optical efficiency and a display apparatus comprising the same.

According to still another exemplary embodiment, there are provided a display apparatus which has a passive type stereoscopic image excellent in visibility.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A display panel with a liquid crystal layer, comprising:
   first and second substrates which are disposed opposite to each other;
   a color filter polarizing layer which is formed on one surface between the first and second substrates, and comprises a first metal linear grid arranged at different pitches to emit a first polarized component of incident light with different colors; and
   a polarizing layer which comprises a second metal linear grid formed on an opposite surface to the one surface between the first and second substrates,
   wherein a metal contained in the first metal linear grid is different in properties from a metal contained in the second metal linear grid.

2. The display panel according to claim 1, wherein one of the first metal linear grid and the second metal linear grid arranged on a substrate for incident light has higher reflectivity than the other one.

3. The display panel according to claim 1, wherein one of the first metal linear grid and the second metal linear grid arranged on a substrate for exit light is stronger than the other one.

4. The display panel according to claim 1, wherein the metal contained in the first metal linear grid is different from the metal contained in the second metal linear grid.

5. The display panel according to claim 1, wherein one of the first substrate and the second substrate for incident light further comprises a light absorbing layer formed on the metal linear grid and absorbing light.

6. The display panel according to claim 1, wherein one of the first substrate and the second substrate for exit light further comprises a light absorbing layer formed beneath the metal linear grid and absorbing light.

7. The display panel according to claim 1, further comprising a pixel layer formed on the one surface between the first substrate and the second substrate and including a pixel comprising a plurality of sub pixels,
   wherein at least three sub pixels are different in the pitch of the first metal linear grids.

8. The display panel according to claim 1, wherein
   the first metal linear grid comprises a red metal linear grid, a green metal linear grid and a blue metal linear grid, and
   the red metal linear grid is arranged such that every pitch is shorter than ½ of a red light wavelength, the green metal linear grid is arranged such that every pitch is shorter than ½ of a green light wavelength, and the blue metal linear grid is arranged such that every pitch is shorter than ½ of a blue light wavelength.

9. The display panel according to claim 1, wherein the first metal linear grid comprises a first metal layer, an insulating layer, and a second metal layer stacked in sequence.

10. The display panel according to claim 1, wherein a height of the first metal linear grid is larger than a width of the first metal linear grid.

11. The display panel according to claim 1, wherein the color filter polarizing layer further comprises a dielectric layer stacked beneath the first metal linear grid.

12. A display apparatus with a liquid crystal layer, comprising:
   a display panel which comprises first and second substrates which are disposed opposite to each other, a color filter polarizing layer which is formed on one surface between the first and second substrates, and comprises a first metal linear grid arranged at different pitches to emit a first polarized component of incident light with different colors, and a polarizing layer which comprises a second metal linear grid formed on an opposite surface to the one surface between the first and second substrates,
   wherein a metal contained in the first metal linear grid is different in properties from a metal contained in the second metal linear grid; and
   a backlight assembly which emits light to the display panel.

13. The display apparatus according to claim 12, wherein one of the first metal linear grid and the second metal linear grid arranged on a substrate for incident light has higher reflectivity than the other one.

14. The display apparatus according to claim 12, wherein one of the first metal linear grid and the second metal linear grid arranged on a substrate for exiting light is stronger than the other one.

15. The display apparatus according to claim 12, wherein the metal contained in the first metal linear grid is different from the metal contained in the second metal linear grid.

16. The display apparatus according to claim 12, wherein one of the first substrate and the second substrate for incident light further comprises a light absorbing layer formed on the metal linear grid and absorbing light.

17. The display apparatus according to claim 12, wherein one of the first substrate and the second substrate for exiting light further comprises a light absorbing layer formed beneath the metal linear grid and absorbing light.

18. The display apparatus according to claim 12, further comprising a pixel layer formed on one surface between the first substrate and the second substrate and formed with a pixel comprising a plurality of sub pixels, wherein at least three sub pixels are different in the pitch of the first metal linear grids.

19. The display apparatus according to claim 12, wherein the first metal linear grid comprises a red metal linear grid, a green metal linear grid and a blue metal linear grid, and
   the red metal linear grid is arranged such that every pitch is shorter than ½ of a red light wavelength, the green metal linear grid is arranged such that every pitch is shorter than ½ of a green light wavelength, and the blue metal linear grid is arranged such that every pitch is shorter than ½ of a blue light wavelength.

20. The display apparatus according to claim 12, wherein the first metal linear grid comprises a first metal layer, an insulating layer, and a second metal layer stacked in sequence.

21. The display apparatus according to claim 12, wherein a height of the first metal linear grid is larger than a width of the first metal linear grid.

22. The display apparatus according to claim 12, wherein the color filter polarizing layer further comprises a dielectric layer stacked beneath the first metal linear grid.

* * * * *